(12) United States Patent
Ota et al.

(10) Patent No.: US 7,934,485 B2
(45) Date of Patent: May 3, 2011

(54) INTERNAL COMBUSTION ENGINE CONTROL DEVICE

(75) Inventors: Masayoshi Ota, Nishikamo-gun (JP); Yusuke Saigo, Toyota (JP); Yoshiyasu Ito, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 12/461,014

(22) Filed: Jul. 29, 2009

(65) Prior Publication Data

US 2010/0024768 A1 Feb. 4, 2010

(30) Foreign Application Priority Data

Aug. 1, 2008 (JP) ................................ 2008-199930

(51) Int. Cl.
*F02D 45/00* (2006.01)
(52) U.S. Cl. ........................................ 123/350; 701/110
(58) Field of Classification Search .......... 701/110–114; 123/350–355, 478–480, 399–400, 687–688
See application file for complete search history.

(56) References Cited

U.S. PATENT DOCUMENTS

| | | | | |
|---|---|---|---|---|
| 4,351,287 A * | 9/1982 | Shirasaki et al. | ........... | 123/609 |
| 5,122,961 A * | 6/1992 | Toyama et al. | ........... | 701/208 |
| 5,551,396 A * | 9/1996 | Suzuki et al. | ........... | 123/399 |
| 6,626,144 B1 * | 9/2003 | Kanamaru | ........... | 123/399 |
| 7,082,936 B2 * | 8/2006 | Sakaguchi et al. | ........... | 123/688 |
| 7,143,742 B2 * | 12/2006 | Nakane | ........... | 123/339.15 |
| 7,471,003 B2 * | 12/2008 | Kobayashi et al. | ........... | 290/40 C |
| 2002/0020391 A1 * | 2/2002 | Satou et al. | ........... | 123/396 |
| 2005/0015196 A1 * | 1/2005 | Hawkins | ........... | 701/110 |
| 2005/0211222 A1 * | 9/2005 | Demura et al. | ........... | 123/339.11 |
| 2008/0026653 A1 * | 1/2008 | Ito et al. | ........... | 440/84 |
| 2008/0215230 A1 * | 9/2008 | Yamada et al. | ........... | 701/115 |

FOREIGN PATENT DOCUMENTS

| | | |
|---|---|---|
| EP | 2 031 223 A2 | 3/2009 |
| EP | 2 071 163 A2 | 6/2009 |
| GB | 2 329 427 A | 3/1999 |
| JP | A-59-85442 | 5/1984 |
| JP | A-59-85443 | 5/1984 |
| JP | A-63-259140 | 10/1988 |
| JP | A-10-110642 | 4/1998 |
| JP | A-2001-41072 | 2/2001 |
| JP | A-2003-184589 | 7/2003 |

(Continued)

OTHER PUBLICATIONS

Office Action issued in Japanese Patent Application No. 2008-199930, on May 11, 2010 (with partial translation).

(Continued)

*Primary Examiner* — Stephen K Cronin
*Assistant Examiner* — Johnny H Hoang
(74) *Attorney, Agent, or Firm* — Oliff & Berridge, PLC

(57) ABSTRACT

A control device for an internal combustion engine which transmits output to a drive-train via a dual mass flywheel, the control device including: an engine rotational state detecting unit that detects a rotational state of the internal combustion engine; a rotational fluctuation inhibiting unit that executes a process of inhibiting rotational fluctuation for the internal combustion engine when a rotational state that is detected by the engine rotational state detecting unit satisfies a rotational fluctuation inhibiting condition; and a rotational fluctuation inhibiting condition adjusting unit that is adjusts the rotational fluctuation inhibiting condition based on a operating state of the internal combustion engine.

11 Claims, 15 Drawing Sheets

FOREIGN PATENT DOCUMENTS

| | | |
|---|---|---|
| JP | A-2005-54601 | 3/2005 |
| JP | A-2006-183484 | 7/2006 |
| JP | A-2007-032377 | 2/2007 |
| JP | A-2008-151036 | 7/2008 |

OTHER PUBLICATIONS

European Search Report issued in Application No. 09 16 6873.1; mailed on Nov. 10, 2009.

* cited by examiner

[COMPARATIVE EXAMPLE]

INTERNAL COMBUSTION ENGINE CONTROL DEVICE

INCORPORATION BY REFERENCE

The disclosure of Japanese Patent Application No. 2008-199930 filed on Aug. 1, 2009 including the specification, drawings and abstract is incorporated herein by reference in its entirety.

BACKGROUND OF THE INVENTION

1. Field of the Invention

The present invention relates to a control device for an internal combustion engine which transmits output to a drive-train via a dual mass flywheel.

2. Description of the Related Art

A technique is known that a dual mass flywheel is used to inhibit torque fluctuation of an internal combustion engine from being transmitted to a drive-train (see, for example, Japanese Patent Application Publication No. 2005-54601 (JP-A-2005-54601) and Japanese Patent Application. Publication No. 2006-183484 (JP-A-2006-183484)). The dual mass flywheel includes two flywheels that are connected together by an elastic body such as a spring. Therefore, the dual mass flywheel has a resonance frequency. If resonance occurs, it causes a large oscillation amplitude between the two flywheels. This may result in a shock due to an impact with the spring.

To inhibit such resonance of the dual mass flywheel, the resonance point is normally set at an engine speed range that is lower than the idling speed. However, the engine speed temporarily becomes lower than the idling speed depending on the operating state of the internal combustion engine. Therefore, only such a setting of the resonance point cannot sufficiently inhibit resonance of the dual mass flywheel.

In JP-A-2005-54601 (on pages 5 to 9 and FIGS. 2 to 5), in the case that the engine speed of the internal combustion engine is retained at the resonance rotational speed range for a specified period, fuel supply is stopped or reduced to control so that the engine speed of the internal combustion engine is retained out of the resonance rotational speed range. In JP-A-2006-183484 (on pages 3 to 5 and FIG. 2), the maximum fuel injection amount at the engine speed that is lower than the idling speed is limited to not more than the maximum fuel injection amount at the idling speed.

However, there are cases that such techniques cannot effectively inhibit resonance depending on the operating state of the internal combustion engine or the output transmitting state of the drive-train. In other words, there are cases that the resonance inhibiting process delays when deceleration is rapidly made in the internal combustion engine for a vehicle and therefore strong resonance may occur. Further, the resonance rotational speed differs according to the gear position of a transmission that transmits the output to the drive-train of the internal combustion engine. Therefore, strong resonance may occur in certain gear positions since the resonance inhibiting process works too late. In the other gear positions, conversely, the resonance inhibiting process works too quickly and thus reduces the output of the internal combustion engine more than necessary. This may result in an engine stall.

SUMMARY OF THE INVENTION

The present invention controls the resonance inhibiting process at an appropriate timing in contemplation of the approaching of the engine speed of the internal combustion engine to the resonance rotational speed.

A first aspect of the present invention provides a control device for an internal combustion engine that transmits output to a drive-train via a dual mass flywheel, the control device including: an engine rotational state detecting unit that detects a rotational state of the internal combustion engine; a rotational fluctuation inhibiting unit that executes a process of inhibiting rotational fluctuation for the internal combustion engine when a rotational state that is detected by the engine rotational state detecting unit satisfies a rotational fluctuation inhibiting condition; and a rotational fluctuation inhibiting condition adjusting unit that adjusts the rotational fluctuation inhibiting condition based on a operating state of the internal combustion engine.

The rotational fluctuation inhibiting condition adjusting unit adjusts the rotational fluctuation inhibiting condition that is used in the rotational fluctuation inhibiting unit based on the operating state of the internal combustion engine. The adjustment allows the control device taking into consideration the approaching state of the engine speed of the internal combustion engine to the resonance rotational speed. Therefore, the resonance inhibiting process may be executed at an appropriate timing, thus allowing inhibition of strong resonance and an engine stall.

In the first aspect, the rotational fluctuation inhibiting condition adjusting unit may adjust the rotational fluctuation inhibiting condition so that the rotational fluctuation inhibiting condition is earlier satisfied when the rotational state that is detected by the engine rotational state detecting unit more easily approaches the resonance rotational speed of the dual mass flywheel.

The rotational fluctuation inhibiting condition is adjusted, and thereby the rotational fluctuation inhibiting condition is earlier satisfied when the rotational state of the internal combustion engine more easily approaches the resonance rotational speed of the dual mass flywheel. In other words, the rotational fluctuation inhibiting condition is more slowly satisfied when the rotational state of the internal combustion engine less easily approaches the resonance rotational speed of the dual mass flywheel.

Accordingly, the resonance inhibiting process can be executed at an appropriate timing, thus allowing inhibition of strong resonance and an engine stall.

In the first aspect, the internal combustion engine rotational state detecting unit may detect an average engine speed of the internal combustion engine as the rotational state. The rotational fluctuation inhibiting unit may set, as the rotational fluctuation inhibiting condition, a condition that an actual average engine speed of the internal combustion engine is lower than a reference value that is set for the average engine speed of the internal combustion engine. Further, the rotational fluctuation inhibiting condition adjusting unit may adjust the reference value so that the rotational fluctuation inhibiting condition is earlier satisfied when the deceleration of the average engine speed of the internal combustion engine that is detected by the internal combustion engine rotational state detecting unit is larger.

When the deceleration of the average engine speed of the internal combustion engine is large, a rotational state is achieved such that the actual average engine speed of the internal combustion engine rapidly approaches a value smaller than the reference value. The rotational fluctuation inhibiting condition is earlier satisfied when the deceleration of the average engine speed of the internal combustion engine is larger. Accordingly, the resonance inhibiting process is early started. As a result, the process of inhibiting the rotational fluctuation can be executed before strong resonance actually occurs, thereby allowing inhibition of resonance. Conversely, the rotational fluctuation inhibiting condition is more slowly satisfied when the deceleration of the average engine speed of the internal combustion engine is smaller. As a result, the output of the internal combustion engine can be prevented from unnecessarily early decreasing. This allows prevention of an engine stall.

In the above configuration, the rotational fluctuation inhibiting condition adjusting unit may increase the reference value to a larger value when the deceleration of the average engine speed of the internal combustion engine that is detected by the engine rotational state detecting unit is larger.

More specifically, the reference value is increased to a larger value when the deceleration of the average engine speed of the internal combustion engine is larger, as described above. This allows the rotational fluctuation inhibiting condition being early satisfied. Further, the reference value is reduced to a smaller value when the deceleration of the average engine speed of the internal combustion engine is smaller. This allows the rotational fluctuation inhibiting condition being slowly satisfied.

Accordingly, the resonance inhibiting process can be executed at an appropriate timing, thus allowing inhibition of strong resonance and an engine stall.

In the first aspect, the engine rotational state detecting unit may detect rotational fluctuation of the internal combustion engine and the average engine speed of the internal combustion engine as the rotational state. The rotational fluctuation inhibiting unit may set, as the rotational fluctuation inhibiting condition, a condition that an actual engine speed fluctuation amount of the internal combustion engine is larger than a reference value that is set for the engine speed fluctuation amount of the internal combustion engine. Further, the rotational fluctuation inhibiting condition adjusting unit may adjust the reference value so that the rotational fluctuation inhibiting condition is earlier satisfied when the deceleration of the average engine speed of the internal combustion engine that is detected by the internal combustion engine rotational state detecting unit is larger.

When the deceleration of the average engine speed of the internal combustion engine is larger, the rotational state more rapidly approaches the resonance rotational speed and more rapidly approaches a state that the actual engine speed fluctuation amount of the internal combustion engine becomes larger than the reference value. The rotational fluctuation inhibiting condition is earlier satisfied when the deceleration of the average engine speed of the internal combustion engine is larger. Accordingly, the resonance inhibiting process is earlier started. This allows the control device to work before strong resonance actually occurs. Thereby, resonance can be inhibited. In other words, the rotational fluctuation inhibiting condition is more slowly satisfied when the deceleration of the average engine speed of the internal combustion engine is smaller. Therefore, the resonance inhibiting process is not executed unnecessarily early. Accordingly, the output of the internal combustion engine can be prevented from decreasing more than necessary, thus allowing prevention of an engine stall.

In the above configuration, the rotational fluctuation inhibiting condition adjusting unit may reduce the reference value to a smaller value when the deceleration of the average engine speed of the internal combustion engine that is detected by the engine rotational state detecting unit is larger.

More specifically, the reference value is reduced to a smaller value when the deceleration of the average engine speed of the internal combustion engine is larger, as described above. This allows the rotational fluctuation inhibiting condition being early satisfied. In other words, the reference value is increased to a larger value when the deceleration of the average engine speed of the internal combustion engine is smaller. The reference value is increased to a larger value as described above. This allows the rotational fluctuation inhibiting condition being slowly satisfied.

Accordingly, the resonance inhibiting process can be executed at an appropriate timing, thus allowing inhibition of strong resonance and an engine stall.

In the above configuration, the rotational fluctuation inhibiting unit may set, as the rotational fluctuation inhibiting condition, a condition that an actual average engine speed of the internal combustion engine is lower than the reference value that is set for the average engine speed of the internal combustion engine and an actual engine speed fluctuation amount of the internal combustion engine is larger than the reference value set for the engine speed fluctuation amount of the internal combustion engine. Further, the rotational fluctuation inhibiting unit may execute the process of inhibiting rotational fluctuation for the internal combustion engine when the both conditions are satisfied.

That is, when the deceleration of the average engine speed of the internal combustion engine is larger, the rotational state more rapidly approaches a state that the actual average engine speed of the internal combustion engine becomes lower than the reference value, and more rapidly approaches a state that the actual engine speed fluctuation amount of the internal combustion engine becomes larger than the reference value.

Therefore, the two rotational fluctuation inhibiting conditions are earlier satisfied when the deceleration of the average engine speed of the internal combustion engine is larger. Accordingly, the resonance inhibiting process is early started. In other words, the two rotational fluctuation inhibiting conditions are more slowly satisfied when the deceleration of the average engine speed of the internal combustion engine is smaller, and thereby the resonance inhibiting process is slowly started.

This allows highly accurate determination about the state that strong resonance actually occurs and allows the control device working before strong resonance occurs. Further, the output of the internal combustion engine can be prevented from unnecessarily decreasing. This allows inhibition of strong resonance and an engine stall.

In the first aspect, the internal combustion engine is for driving a vehicle. The engine rotational state detecting unit may detect vehicle deceleration as the rotational state of the internal combustion engine.

As described above, the vehicle deceleration can be used as the rotational state of the internal combustion engine in the case that the internal combustion engine is for driving the vehicle. This also allows an execution of the resonance inhibiting process at an appropriate timing, thus allowing inhibition of strong resonance and an engine stall.

In the first aspect, the control device may further includes a drive-train output transmitting state detecting unit that detects an output transmitting state of the drive-train. The rotational fluctuation inhibiting condition adjusting unit may change the adjustment state of the rotational fluctuation inhibiting condition based on the output transmitting state that is detected by the drive-train output transmitting state detecting unit.

The resonance rotational speed changes in response to the output transmitting state of the drive-train. Therefore, the rotational fluctuation inhibiting condition adjusting unit changes the adjustment state of the rotational fluctuation inhibiting condition based on the output transmitting state that is detected by the drive-train output transmitting state detecting unit. This allows the control device handling the change in the resonance rotational speed. Accordingly, the rotational fluctuation inhibiting condition can be more highly accurately set.

In the above configuration, the rotational fluctuation inhibiting condition adjusting unit may change the adjustment state of the rotational fluctuation inhibiting condition based on resonance rotational speed of the dual mass flywheel that changes in response to the output transmitting state that is detected by the drive-train output transmitting state detecting unit.

More specifically, the adjustment state of the rotational fluctuation inhibiting condition is changed based on the resonance rotational speed of the dual mass flywheel that changes in response to the output transmitting state, thereby realizing more highly accurate setting of the rotational fluctuation inhibiting condition.

In the above configuration, the drive-train may include a transmission. The drive-train output transmitting state detecting unit may detect a gear position of the transmission as the output transmitting state of the drive-train.

As described above, the gear position of the transmission can be used as the output transmitting state of the drive-train. Accordingly, the rotational fluctuation inhibiting condition can be highly accurately set based on the difference in the resonance rotational speed according to the gear positions.

A second aspect of the present invention provides a control device for an internal combustion engine that transmits output to a drive-train via a dual mass flywheel, the control device including: a drive-train output transmitting state detecting unit that detects an output transmitting state of the drive-train; an engine rotational state detecting unit that detects a rotational state of the internal combustion engine; a rotational fluctuation inhibiting unit that executes a process of inhibiting rotational fluctuation for the internal combustion engine when a rotational state that is detected by the engine rotational state detecting unit satisfies a rotational fluctuation inhibiting condition; and a rotational fluctuation inhibiting condition adjusting unit that adjusts the rotational fluctuation inhibiting condition based on an output transmitting state that is detected by the drive-train output transmitting state detecting unit.

The rotational fluctuation inhibiting condition adjusting unit adjusts the rotational fluctuation inhibiting condition that is used in the rotational fluctuation inhibiting unit based on the output transmitting state from the internal combustion engine to the drive-train. The adjustment allows the control device accurately determining the approaching state of the average engine speed of the internal combustion engine to the resonance rotational speed. Therefore, the resonance inhibiting process can be executed at an appropriate timing, thus allowing inhibition of strong resonance and an engine stall.

In the second aspect, the drive-train may include a transmission. The drive-train output transmitting state detecting unit may detect the gear position of the transmission as the output transmitting state of the drive-train.

As described above, the gear position of the transmission can be used as the output transmitting state of the drive-train. Accordingly, the rotational fluctuation inhibiting condition can be highly accurately set based on the difference in the resonance rotational speed according to the gear positions.

In the second aspect, the rotational fluctuation inhibiting condition adjusting unit may adjust the rotational fluctuation inhibiting condition so that the rotational fluctuation inhibiting condition is earlier satisfied when the output transmitting state that is detected by the drive-train output transmitting state detecting unit more easily approaches the resonance rotational speed of the dual mass flywheel.

As described above, the rotational fluctuation inhibiting condition is adjusted so that the rotational fluctuation inhibiting condition is early satisfied when the output transmitting state more easily approaches the resonance rotational speed. In other words, conversely, the rotational fluctuation inhibiting condition is adjusted so that the rotational fluctuation inhibiting condition is more slowly satisfied when the output transmitting state less easily approaches the resonance rotational speed. Accordingly, the resonance inhibiting process can be executed at an appropriate timing, thus allowing inhibition of strong resonance and an engine stall.

In the second aspect, the rotational fluctuation inhibiting condition adjusting unit may adjust the rotational fluctuation inhibiting condition based on the resonance rotational speed of the dual mass flywheel that corresponds to the output transmitting state that is detected by the drive-train output transmitting state detecting unit.

More specifically, the rotational fluctuation inhibiting condition is adjusted based on the resonance rotational speed of the dual mass flywheel that corresponds to the output transmitting state. This allows more accurate determination about the state that strong resonance actually occurs and allows the control device working before strong resonance occurs.

In the above configuration, the engine rotational state detecting unit may detect an average engine speed of the internal combustion engine as the rotational state. The rotational fluctuation inhibiting unit may set, as the rotational fluctuation inhibiting condition, a condition that an actual average engine speed of the internal combustion engine is lower than a reference value that is set for the average engine speed of the internal combustion engine. Further, the rotational fluctuation inhibiting condition adjusting unit may increase the reference value to a larger value when the resonance rotational speed that corresponds to the output transmitting state that is detected by the drive-train output transmitting state detecting unit is higher, and thereby adjust the rotational fluctuation inhibiting condition so that the condition is early satisfied.

When the resonance rotational speed is high, the actual engine speed of the internal combustion engine easily reaches the resonance rotational speed. Therefore, the reference value is increased to a larger value when the resonance rotational speed is higher, in other words, when the rotational state more easily approaches the resonance rotational speed. Accordingly, the rotational fluctuation inhibiting condition is early satisfied. Conversely, the reference value is reduced to a smaller value when the resonance rotational speed is lower, in other words, when the rotational speed less easily approaches the resonance rotational speed. Thereby, the rotational fluctuation inhibiting condition is slowly satisfied.

Accordingly, the resonance inhibiting process can be executed at an appropriate timing, thus allowing inhibition of strong resonance and an engine stall.

In the above configuration, the engine rotational state detecting unit may detect rotational fluctuation of the internal combustion engine as the rotational state. The rotational fluctuation inhibiting unit may set, as the rotational fluctuation inhibiting condition, a condition that an actual engine speed fluctuation amount of the internal combustion engine is larger than a reference value that is set for the engine speed fluctuation amount of the internal combustion engine. Further, the rotational fluctuation inhibiting condition adjusting unit may reduce the reference value to a smaller value when the resonance rotational speed that corresponds to the output transmitting state that is detected by the drive-train output transmitting state detecting unit is higher, and thereby may adjust the rotational fluctuation inhibiting condition so that the condition is early satisfied.

As described above, when the resonance rotational speed is high, the actual engine speed of the internal combustion engine easily reaches the resonance rotational speed. Therefore, the reference value is reduced to a smaller value when the resonance rotational speed is higher, in other words, when the rotational state more easily approaches the resonance rotational speed. Accordingly, the rotational fluctuation inhibiting condition is early satisfied. Conversely, the reference value is increased to a larger value when the resonance rotational speed is lower, in other words, when the rotational speed less easily approaches the resonance rotational speed. Thereby, the rotational fluctuation inhibiting condition is slowly satisfied.

Accordingly, the resonance inhibiting process can be executed at an appropriate timing, thus allowing inhibition of strong resonance and an engine stall.

In the above configuration, the rotational fluctuation inhibiting unit may set, as the rotational fluctuation inhibiting condition, a condition that an actual average engine speed of the internal combustion engine is lower than the reference value that is set for the average engine speed of the internal combustion engine and an actual engine speed fluctuation amount of the internal combustion engine is larger than the reference value that is set for the engine speed fluctuation amount of the internal combustion engine. Further, the rotational fluctuation inhibiting unit may execute the process of inhibiting rotational fluctuation for the internal combustion engine when the conditions are both satisfied.

In other words, when the resonance rotational speed is higher, the adjustment is earlier made so that the actual average engine speed becomes lower than the reference value and the engine speed fluctuation amount of the internal combustion engine becomes larger than the reference value. Conversely, when the resonance rotational speed is lower, the adjustment is more slowly made so that the actual average engine speed becomes lower than the reference value and the engine speed fluctuation amount of the internal combustion engine becomes larger than the reference value.

This allows highly accurate determination about the state that strong resonance actually occurs and allows the control device working before strong resonance occurs. Further, the output of the internal combustion engine can be prevented from unnecessarily decreasing. This allows inhibition of strong resonance and an engine stall.

In the first and second aspects, the rotational fluctuation inhibiting unit may execute either reduction of the output of the internal combustion engine or a change of the output fluctuation frequency of the internal combustion engine or both of those and thereby may execute a process of inhibiting rotational fluctuation for the internal combustion engine.

As described above, either the reduction of the output of the internal combustion engine or the change of the output fluctuation frequency of the internal combustion engine is executed, or both of those are executed, thereby allowing inhibition of rotational fluctuation of the internal combustion engine.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

First Embodiment

Figure 1:
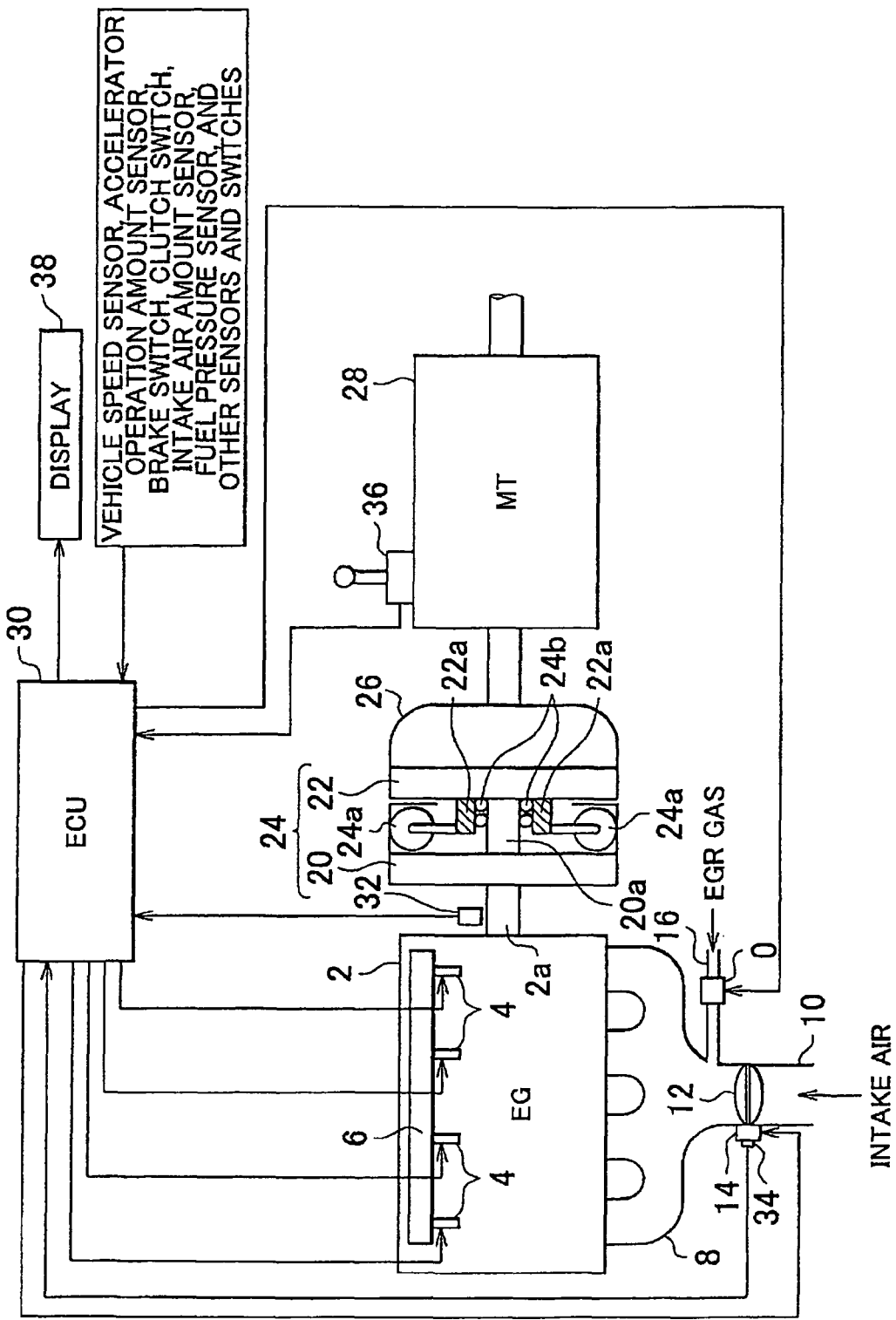
FIG. 1 is a block diagram that shows a schematic configuration of a drive-train and a control system of an internal combustion engine for driving a vehicle in accordance with a first embodiment.

FIG. 1 is a block diagram showing a diesel engine (hereinafter referred to as "engine") 2 as an internal combustion engine for driving a vehicle to which an embodiment of the present invention is applied, a drive-train, and a control system thereof. The engine 2 is a inline four-cylinder engine. A fuel injection valve 4 for directly injecting fuel into a combustion chamber is disposed in each cylinder.

The fuel injection valve 4 communicates with a common rail 6 that accumulates fuel at a predetermined pressure. The common rail 6 is supplied with pressurized fuel from a fuel pump that is rotated by the engine 2. A specified drive current is applied to the fuel injection valve 4, and thereby the fuel injection valve 4 is opened. As a result, pressurized fuel that is distributed from the common rail 6 to the fuel injection valve 4 of each cylinder is injected from the fuel injection valve 4 into the cylinder.

An intake manifold 8 is connected to the engine 2. Each branch pipe of the intake manifold 8 communicates with the combustion chamber of each cylinder via an intake port. The intake manifold 8 is connected to an intake pipe 10. Intake air flows into the intake manifold 8 through the intake pipe 10. A diesel throttle valve (hereinafter referred to as "D-throttle") 12 for regulating the intake air amount is mounted on the intake pipe 10. An electric actuator 14 adjusts the opening of the D-throttle 12. Further, an inter-cooler, a compressor of a turbocharger, and an air cleaner are disposed upstream of the intake pipe 10.

An exhaust gas recirculation passage (EGR passage) 16 opens at a portion of the intake pipe 10 downstream of the D-throttle 12. A part of exhaust gas that flows in the exhaust passage of the engine 2 is introduced into the EGR passage 16 at a portion upstream thereof. Thereby, exhaust gas is introduced into the intake pipe 10 as EGR gas via an EGR valve 18 for adjusting the flow rate.

On the exhaust passage, a turbine of the turbocharger is rotated by fluid energy of exhaust gas. The exhaust gas that has rotated the turbine is purified by an exhaust purifying catalyst and thereafter discharged. The output of the engine 2 is transmitted toward a manual transmission (hereinafter abbreviated as "MT") 28 via a dual mass flywheel (hereinafter abbreviated as "DMF") 24 that includes a primary flywheel 20 and a secondary flywheel 22 and a clutch 26 that is provided on the secondary flywheel 22 side. In this embodiment, the MT 28 is a transmission that has six forward speed and one rearward speed.

The DMF 24 is constructed such that the primary flywheel 20 and the secondary flywheel 22 are connected together via a spring 24a. The primary flywheel 20 and the secondary flywheel 22 are connected together in a manner such that the respective rotational shafts 20a and 22a are capable of relative rotation with bearings 24b interposed therebetween. The output of the engine 2 is transmitted from a crankshaft 2a toward the MT 28 by the DMF 24. Output fluctuation of the engine 2 is absorbed and reduced by the spring 24a. Therefore, torsional oscillation of the drive-train can be inhibited in the normal operation. Further, generation of noise and oscillation due to the torsional oscillation can be reduced.

An electronic control unit (ECU) 30 for controlling the engine operating state is provided for such an engine 2. The ECU 30 is a control circuit that controls the engine operating state according to the engine operating state and demands of a driver. The ECU 30 is mainly constructed with a microcomputer which includes CPU, ROM, RAM, and backup RAM.

The ECU 30 receives various signals from a crankshaft rotational speed sensor 32 that detects the rotational speed of the crankshaft 2a, an opening sensor 34 that detects the opening of the D-throttle 12, and a shift sensor 36 that detects the gear position of the MT 28. The ECU 30 also receives signals from a vehicle speed sensor, an accelerator operation amount sensor, a brake switch, a clutch switch, an intake air amount sensor, a fuel pressure sensor, and other kinds of sensors and switches.

The ECU 30 makes appropriate adjustments for the fuel injection amount, fuel injection timing, opening of the D-throttle 12, and opening of the EGR valve 18 according to detection data of the sensors and switches and each kind of control computation. Information about states of the vehicle and the engine 2 is provided to the driver according to need by LCDs and lamps on a display 38 that is disposed on a dashboard.

Figure 2:
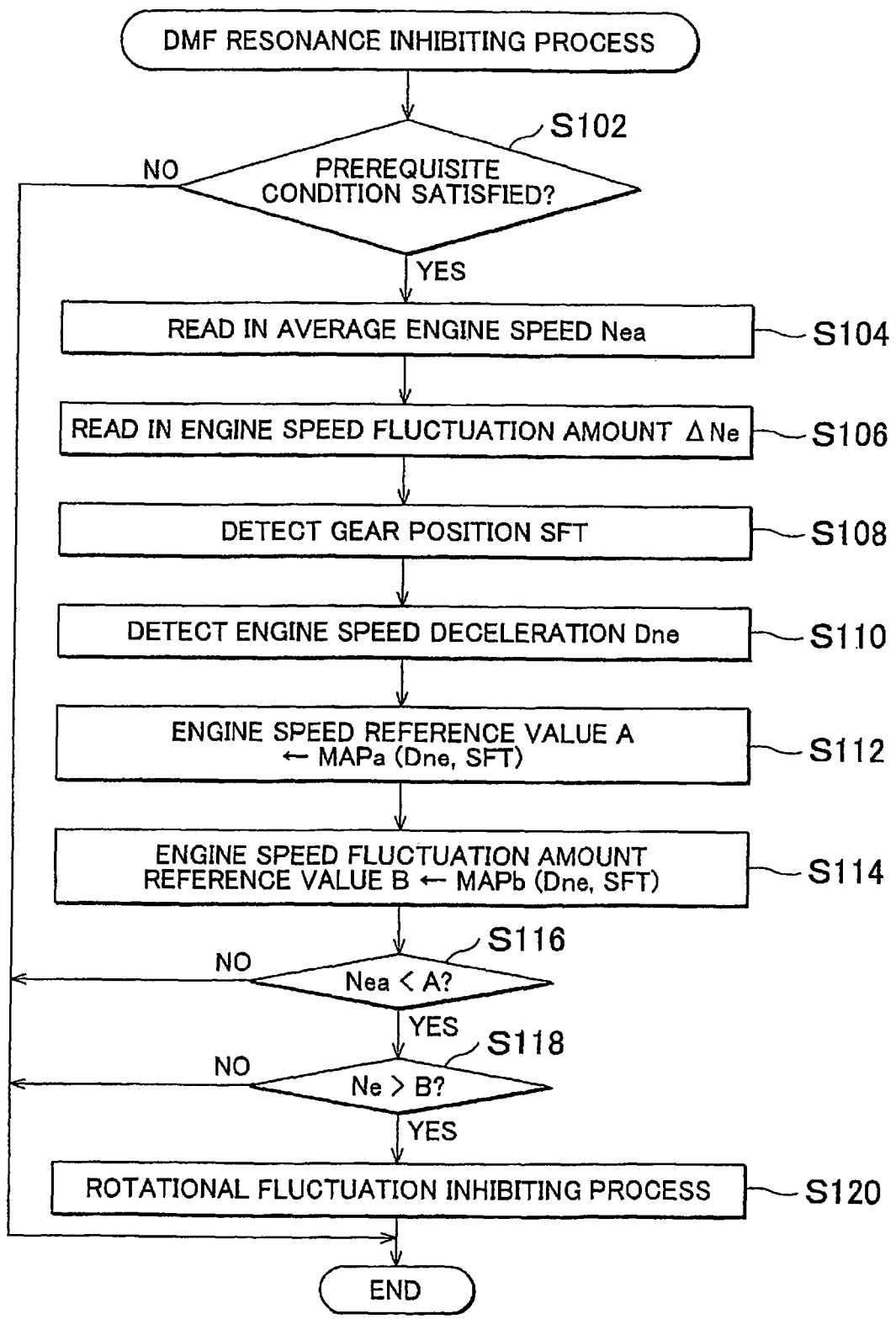
FIG. 2 is a flowchart of a DMF resonance inhibiting process that is executed by an ECU in accordance with the first embodiment.

Next, a DMF resonance inhibiting process that is executed by the ECU 30 will be shown in a flowchart in FIG. 2. The process is repeatedly executed by interruption at a constant time period. Steps in the flowchart corresponding to each process will be denoted as "S-(numeral)".

When the process is started, a determination is first made about whether or not a prerequisite condition for the resonance inhibiting process for the DMF 24 is satisfied (S102). The prerequisite condition is satisfied only if the following three conditions (1) to (3) are all satisfied.

(1) The clutch switch is turned off (the clutch 26 is connected). (2) The starter is turned off. (3) The brake switch is turned on braking by depressing the brake pedal is being made).

If any one of the conditions is not satisfied ("NO" in S102), then the process is terminated. Thereafter, while the prerequisite condition is not satisfied, no substantial process of the DMF resonance inhibiting process (FIG. 2) is executed since it is determined "NO" in step S102.

Figure 3:
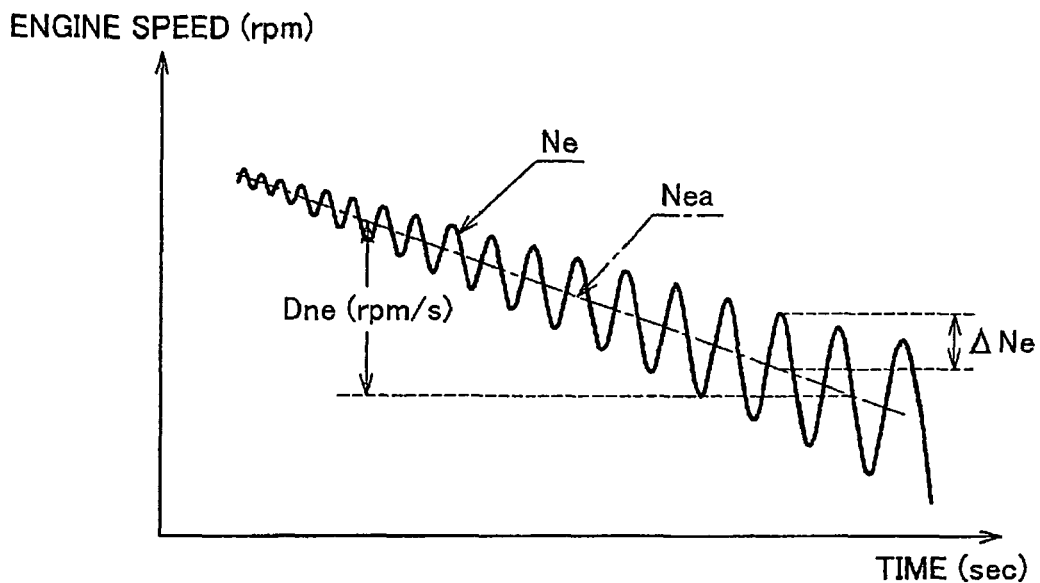
FIG. 3 is a timing chart that indicates the relationship between average engine speed Nea, engine speed fluctuation amount $\Delta$Ne, and engine speed deceleration Dne.

If the prerequisite condition is satisfied ("YES" in S102), an average engine speed Nea (rpm) of the engine 2 is read (S104). As shown in FIG. 3, the average engine speed Nea is an engine speed from which rotational fluctuation of engine 2 is removed and is a value that the ECU 30 separately and repeatedly calculates with the detection value of the crankshaft rotational speed sensor 32 by a filtering process such as a weighted mean process.

Next, an engine speed fluctuation amount ΔNe (rpm) is read (S106). As shown in FIG. 3, the engine speed fluctuation amount ΔNe is a peak value in the absolute values of the differences between the average engine speed Nea and an instant engine speed Ne and is a value that the ECU 30 separately and repeatedly calculates.

Next, a gear position SFT of the MT 28 is detected based on the signal of the shift sensor 36 (S108). Next, an engine speed deceleration Dne (rpm/s) is detected (S110). The engine speed deceleration Dne is a decrease in the average engine speed Nea per a unit time (here one second).

Figure 4:
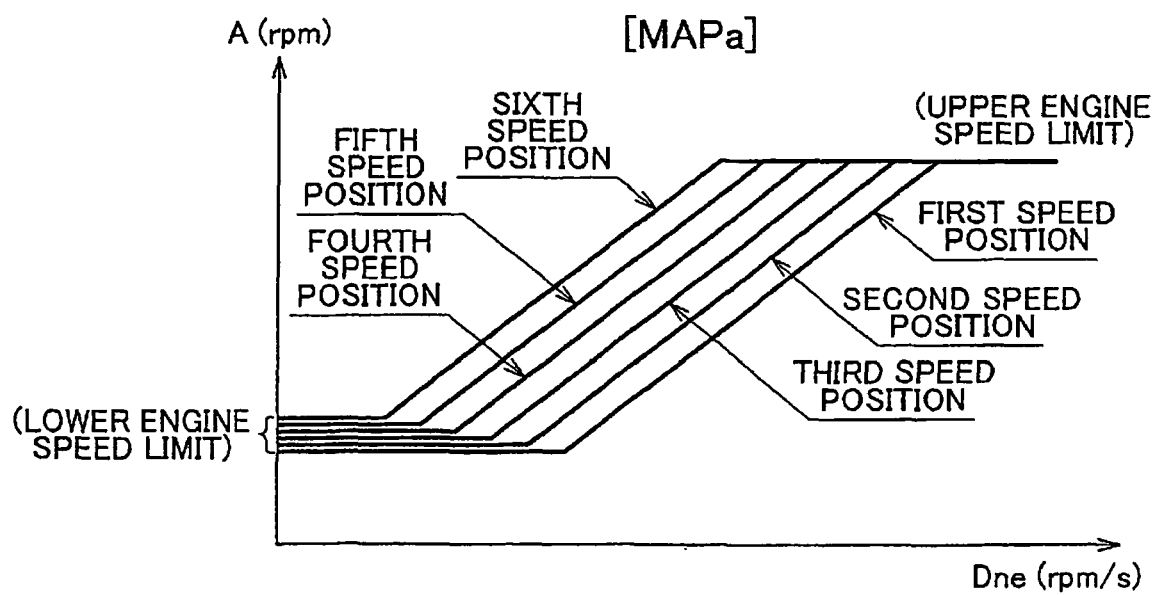
FIG. 4 is a explanatory diagram of an engine speed reference value setting map MAPa that is used in the DMF resonance inhibiting process in accordance with the first embodiment.

Next, an engine speed reference value A (a reference value that is set on the average engine speed of the internal combustion engine) is set according to an engine speed reference value setting map MAPa that is shown in FIG. 4 and based on the engine speed deceleration Dne and the gear position SFT (S112). The map MAPa indicates that if the gear position is fixed, when the engine speed deceleration Dne is larger, in other words, when the average engine speed Nea more rapidly decreases, a higher engine speed is set as the engine speed reference value A. However, since upper and lower limits (lower engine speed limit and upper engine speed limit in the drawing) are provided in a low range and a high range of the engine speed deceleration Dne, the reference value A converges into a certain engine speed.

Further, as shown in FIG. 4, when the gear position SFT is shifted to a higher gear position, a larger engine speed is set as the engine speed reference value A on the map MAPa. However, the engine speed reference value A may not become larger as described above when the gear position SFT is shifted to a higher gear position, depending on types of the MT 28. There are cases that the same engine speed reference value A may be set for several gear positions. Also, there are cases that the magnitude correspondence between the gear position and the engine speed reference value A may be reversed. Such a setting is to cope with change in the resonance rotational speed of the DMF 24 that occurs in response to the difference in the gear position SFT.

In FIG. 4, the engine speed reference value A converges into different lower engine speed limit for each of the gear positions SFT in the lower range of the engine speed deceleration Dne. In this case, the engine speed reference value A converges into a higher engine speed when the gear position SFT is set to a higher gear position. On the other hand, the engine speed reference value A converges into the same upper engine speed limit for all the gear positions in the higher range of the engine speed deceleration Dne.

Figure 5:
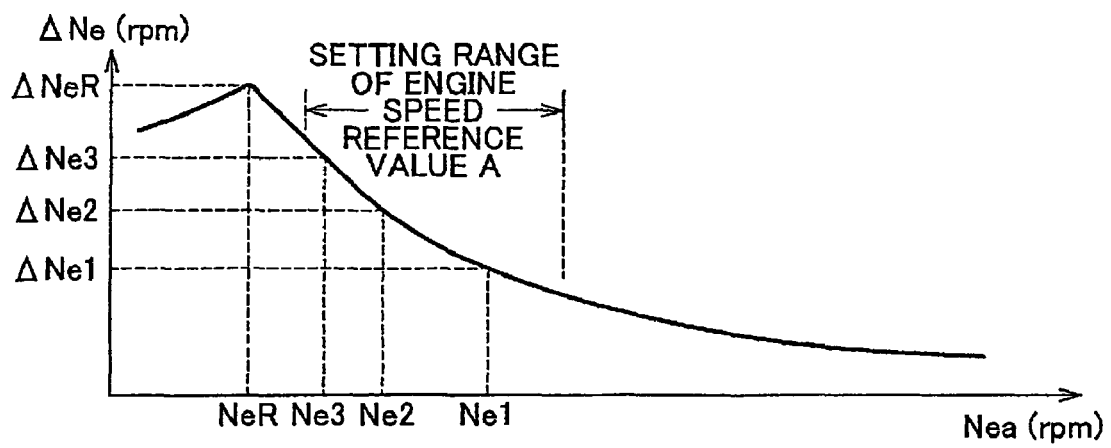
FIG. 5 is a graph that indicates the relationship between the average engine speed Nea and the engine speed fluctuation amount $\Delta$Ne in a diesel engine.

FIG. 5 is a graph that indicates the relationship between the average engine speed Nea and the engine speed fluctuation amount ΔNe at a certain gear position (herein, the fourth gear position). In the graph, each of engine speeds Ne1, Ne2, and Ne3 indicates the engine speed reference value A that is set on the map MAPa based on the engine speed deceleration Dne. The engine speed Ne1 corresponds to the engine speed reference value A in the higher range of the engine speed deceleration Dne. The engine speed Ne2 corresponds to the engine speed reference value A in the intermediate range of the engine speed deceleration Dne. The engine speed Ne3 corresponds to the engine speed reference value A in the lower range of the engine speed deceleration Dne.

A range that such an engine speed reference value A is set according to the map MAPa is set in the higher range that is away from a resonance rotational speed NeR of the DMF 24. Therefore, since the engine speed reference value A is larger when the engine speed deceleration Dne is larger, the decreasing average engine speed Nea early reaches the engine speed reference value A. Conversely, the engine speed reference value A is smaller when the engine speed deceleration Dne is smaller. Therefore, the average engine speed Nea more slowly reaches the engine speed reference value A than the case that the engine speed deceleration Dne is large, in other words, reaches the engine speed reference value A after the average engine speed Nea sufficiently decreases.

Figure 6:
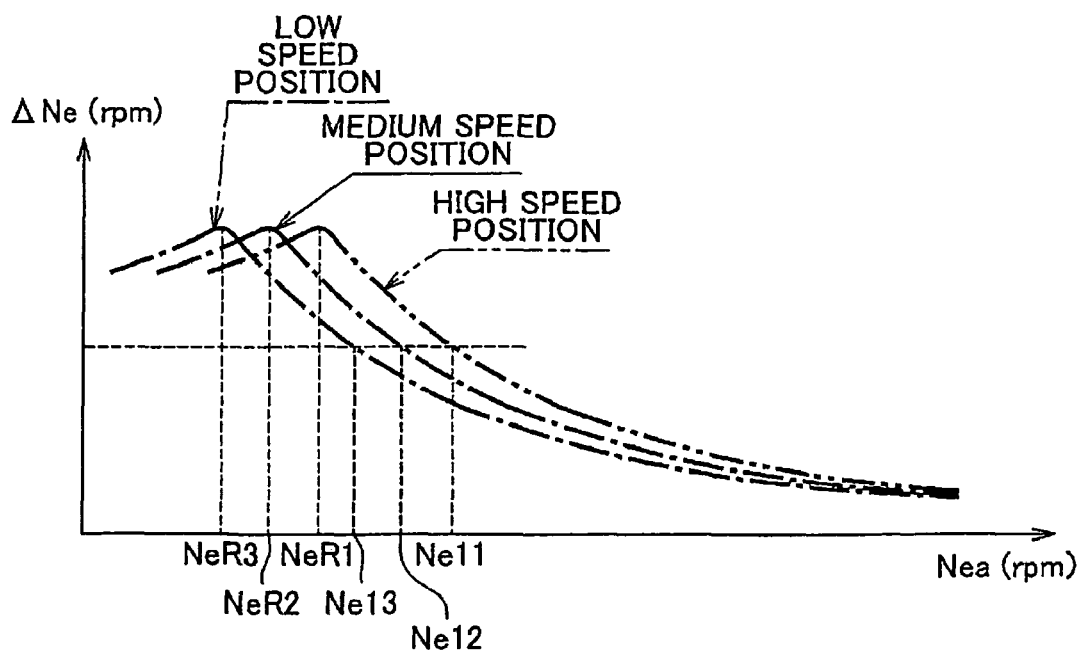
FIG. 6 is a graph that indicates the differences in the relationship between the average engine speed Nea and the engine speed fluctuation amount $\Delta$Ne according to different gear positions.

FIG. 6 is a graph that indicates the relationship between the average engine speed Nea and the engine speed fluctuation amount ΔNe according to different gear positions. In this case, engine speeds Ne11, Ne12, and Ne13 indicate values of the average engine speed Nea for the respective gear positions at the same engine speed fluctuation amount ΔNe. As described above, at the same engine speed fluctuation amount ΔNe, the average engine speed Nea becomes high in the high gear position, the average engine speed Nea becomes an intermediate value in the medium gear position, and the average engine speed Nea becomes low in the low gear position. Therefore, on the map MAPa, the reference value A is set to a large value for the high gear position, an intermediate value for the medium gear position, and a small value for the low gear position.

As described above, since the engine speed reference value A is larger when the MT 28 is in the higher gear position, the decreasing average engine speed Nea early reaches the engine speed reference value A. The engine speed reference value A is smaller when the MT 28 is in the lower gear position. Therefore, the average engine speed Nea more slowly reaches the engine speed reference value A than the higher gear position, in other words, reaches the engine speed reference value A after the average engine speed Nea sufficiently decreases.

Figure 7:
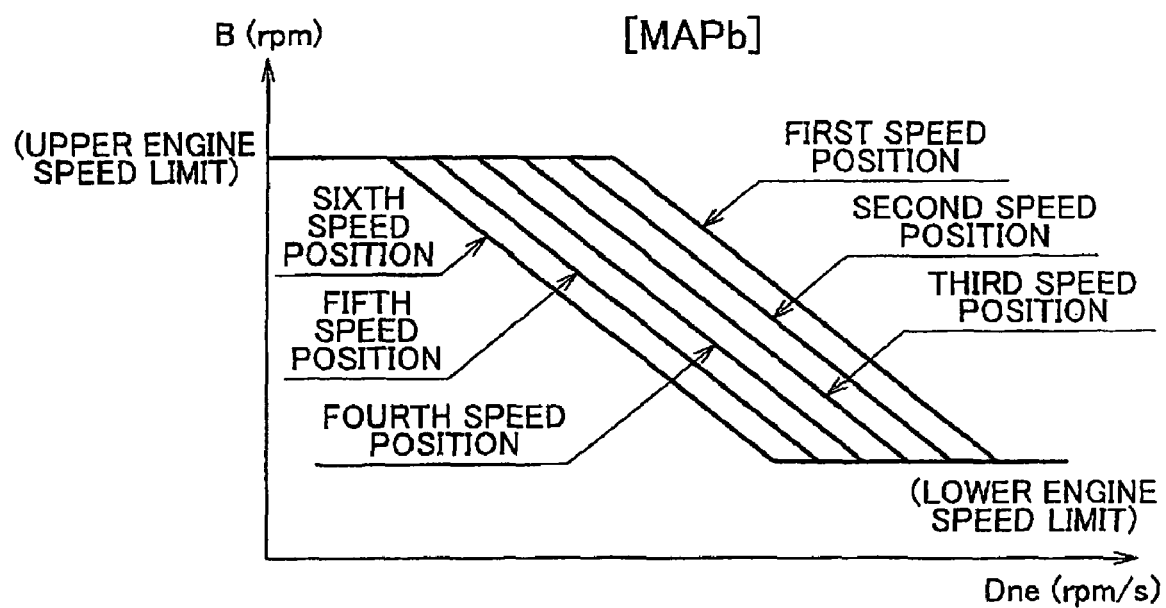
FIG. 7 is a explanatory diagram of an engine speed fluctuation amount reference value setting map MAPb used in the DMF resonance inhibiting process in accordance with the first embodiment.
Figure 8A:
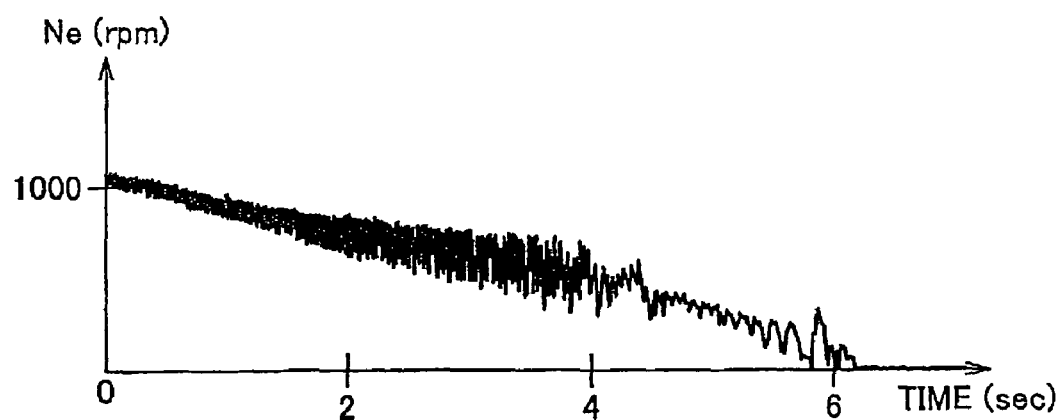
FIGS. 8A, 8B, 8C, and 8D are timing charts during engine speed decrease that illustrates effects of the first embodiment.
Figure 8B:
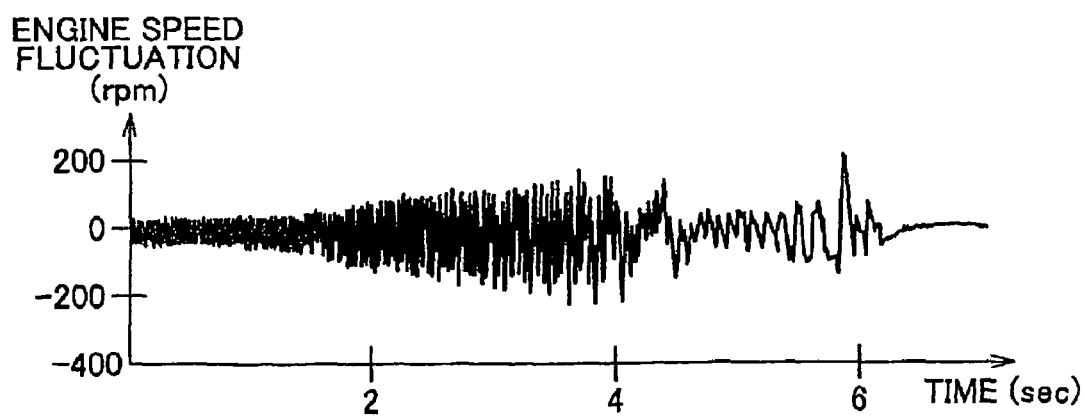
Figure 8C:
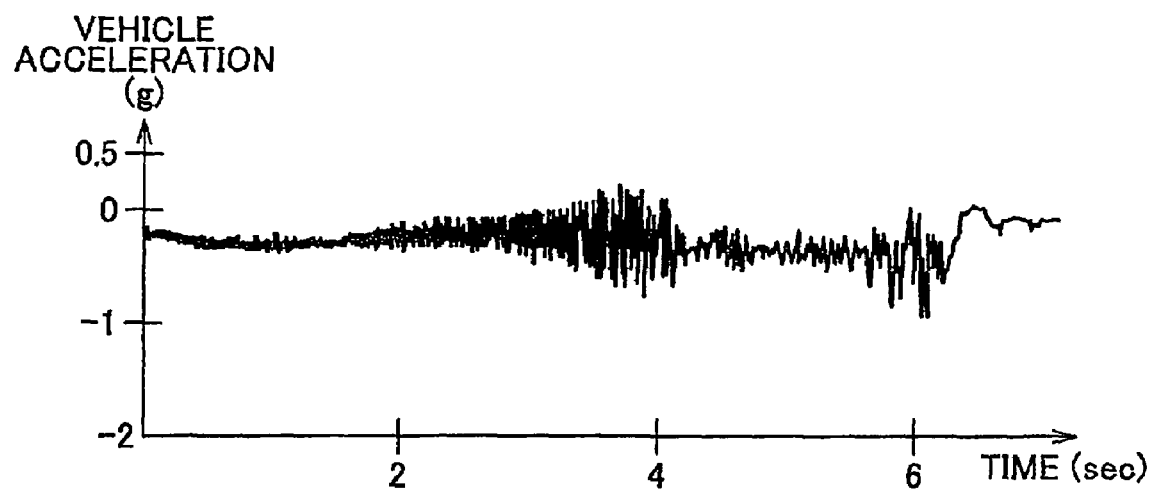
Figure 8D:
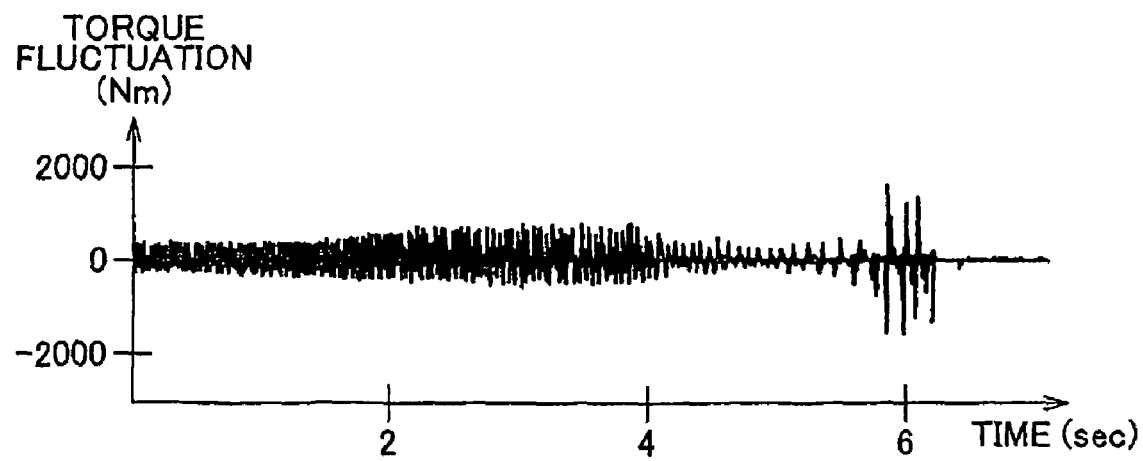
Figure 9A:
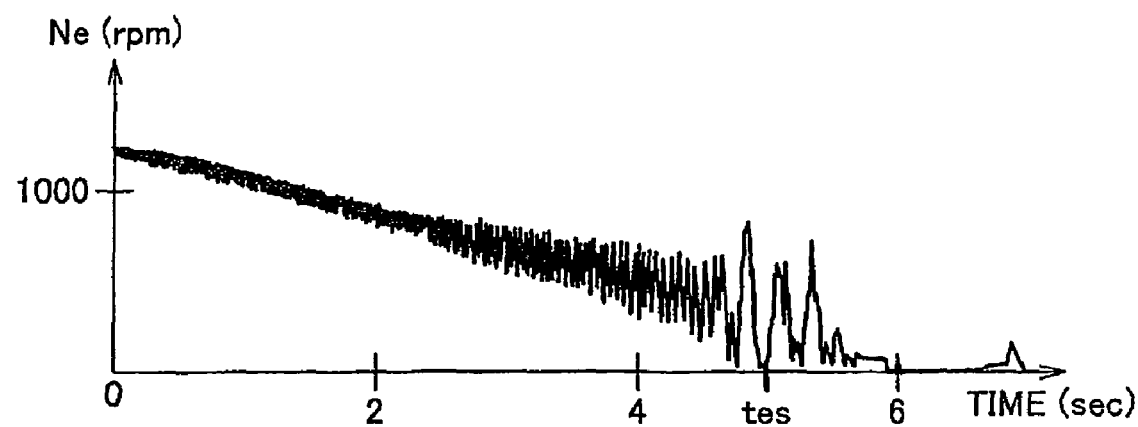
FIGS. 9A, 9B, 9C, and 9D are timing charts during engine speed decrease in a comparative example.
Figure 9B:
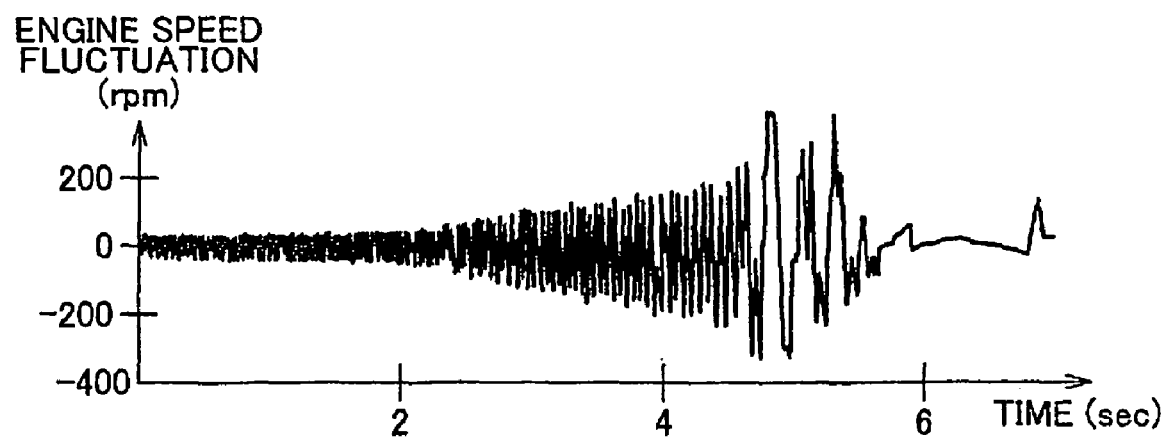
Figure 9C:
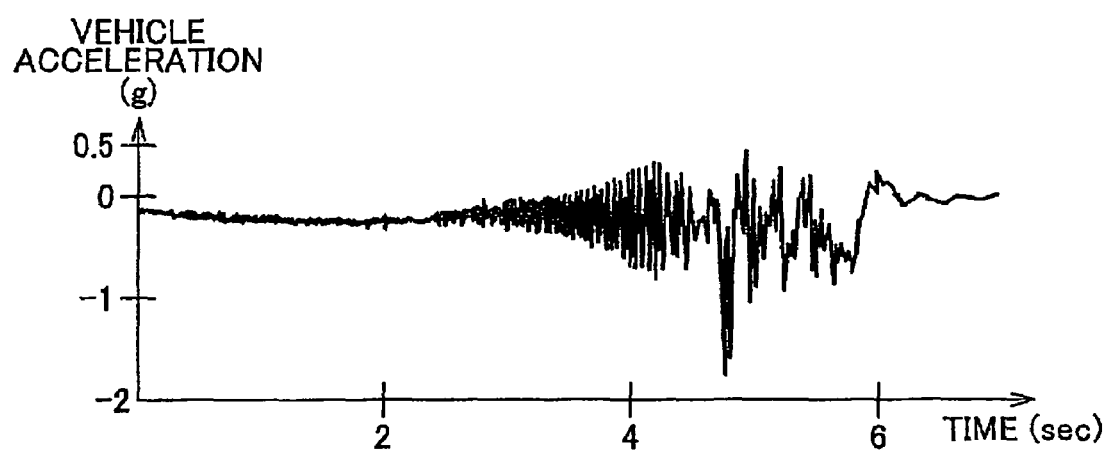
Figure 9D:
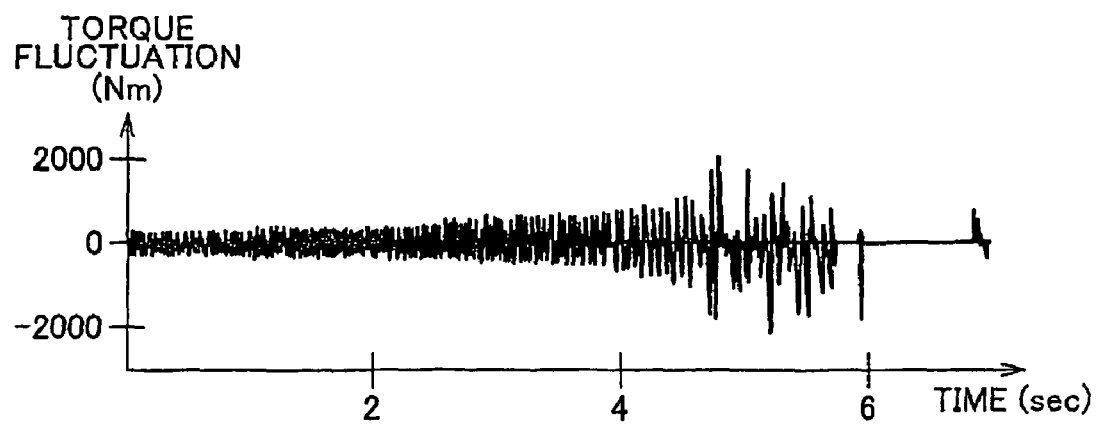

Next, an engine speed reference value B (a reference value that is set on the engine speed fluctuation amount of the internal combustion engine) is set according to an engine speed reference value setting map MAPb that is shown in FIG. 7 and based on the engine speed deceleration Dne and the gear position SFT (S114). The map MAPb indicates that if the gear position is fixed, when the engine speed deceleration Dne is larger, in other words, when the average engine speed Nea more rapidly decreases, a smaller engine speed fluctuation amount is set as the engine speed reference value B. However, since upper and lower limits (lower engine speed limit and upper engine speed limit in the drawing) are provided in a low range and a high range of the engine speed deceleration Dne, the reference value B converges into a certain engine speed fluctuation amount.

Further, as shown in FIG. 7, when the gear position SFT is shifted to a higher gear position, a smaller engine speed fluctuation amount is set as the engine speed fluctuation amount reference value B on the map MAPb. However, the engine speed fluctuation amount reference value B may not become smaller as described above when the gear position SFT is shifted to a higher gear position, depending on types of the MT 28. There are cases that the same engine speed fluctuation amount reference value B may be set for several gear positions. Also, there are cases that the magnitude correspondence between the gear position and the engine speed fluctuation amount reference value B may be reversed. Such a setting is to cope with change in the resonance rotational speed of the DMF 24 that occurs in response to the difference in the gear position SFT.

In FIG. 7, the engine speed fluctuation amount reference value B converges into the same engine speed fluctuation amount for all the gear positions in the lower and higher ranges of the engine speed deceleration Dne. As shown in FIG. 5, the engine speed fluctuation amount ΔNe1 corresponds to the engine speed fluctuation amount reference value B in the higher range of the engine speed deceleration Dne. The engine speed fluctuation amount ΔNe2 corresponds to the engine speed fluctuation amount reference value B in the intermediate range of the engine speed deceleration Dne. The engine speed fluctuation amount ΔNe3 corresponds to the engine speed fluctuation amount reference value B in the lower range of the engine speed deceleration Dne. A range that such an engine speed fluctuation amount reference value B is set according to the map MAPb is set in the lower range that is away from an engine speed fluctuation amount ΔNeR at which resonance occurs.

Therefore, since the engine speed fluctuation amount reference value B becomes smaller when the engine speed deceleration Dne is larger, the increasing engine speed fluctuation amount ΔNe early reaches the engine speed fluctuation amount reference value B. Conversely, the engine speed fluctuation amount reference value B becomes larger when the engine speed deceleration Dne is smaller. Therefore, the engine speed fluctuation amount ΔNe more slowly reaches the engine speed fluctuation amount reference value B than the case that the engine speed deceleration Dne is large, in other words, reaches the engine speed fluctuation amount reference value B after the engine speed fluctuation amount ΔNe increases to a certain degree.

As indicated in FIG. 6, resonance rotational speeds NeR1, NeR2, and NeR3 of the DMF 24 fall into different values in different gear positions. A same average engine speed Nea is a range that the engine speed fluctuation amount ΔNe rapidly increases for the high gear position, a range that the engine speed fluctuation amount ΔNe intermediately increases for the medium gear position, and a range that the engine speed fluctuation amount ΔNe not rapidly increases for the low gear position. Therefore, on the map MAPb, the engine speed fluctuation reference value B is set to a small value for the high gear position, an intermediate value for the medium gear position, and a large value for the low gear position.

Accordingly, since the engine speed fluctuation amount reference value B is smaller when the MT 28 is in the higher gear position, the engine speed fluctuation amount ΔNe that increases in response to decrease in the average engine speed Nea early reaches the engine speed fluctuation reference value B. In the lower gear positions, the engine speed fluctuation amount reference value B is larger when the MT 28 is in the lower gear position. Therefore, even if the engine speed fluctuation amount ΔNe increases to a certain degree, there is time for a fluctuation inhibiting process until the engine speed fluctuation amount ΔNe reaches the engine speed fluctuation amount reference value B.

When the engine speed reference value A and the engine speed fluctuation amount reference value B are set as described above, a determination is next made about whether or not the actual average engine speed Nea is smaller than the engine speed reference value A(S116). If Nea=A ("NO" in S116), then the process is terminated.

If Nea<A ("YES" in S116), a determination is next made about whether or not the engine speed fluctuation amount ΔNe is larger than the engine speed fluctuation amount reference value B (S118). If Nea=B ("NO" in S118), then the process is terminated.

If ΔNe>B ("YES" in S118), a rotational fluctuation inhibiting process (S120) is next executed. In other words, if a rotational fluctuation inhibiting condition that is provided by two conditions of "Nea<A" AND "ΔNe>B" is satisfied, the engine speed fluctuation inhibiting process (S120) is executed.

In the rotational fluctuation inhibiting process (S120), for example, the following processes are executed separately or in a combination. (1). Between the cylinders of the engine 2, either or both of differences in the fuel injection timing and the fuel injection amount by the fuel injection valves 4 are generated, thereby changing the frequency of the output fluctuation that is generated due to change in the crank angle of the engine 2. Accordingly, the average engine speed Nea is varied from the resonance rotational speed of the DMF 24.

(2). The opening of the D-throttle 12 is reduced, thereby reducing the intake air amount of the engine 2. Accordingly, the engine output is reduced. (3). The fuel injection amount from the fuel injection valve 4 is reduced. Accordingly, the engine output is reduced.

(4). The fuel injection timing from the fuel injection valve 4 is retarded. Accordingly, the engine output is reduced. The rotational fluctuation inhibiting process (S120) is executed separately or in a combination with those processes thereby inhibiting an excessive torque shock due to resonance.

In the configuration described above, the ECU 30 functions as an engine rotational state detecting unit, a rotational fluctuation inhibiting unit, and a rotational fluctuation inhibiting condition adjusting unit. The shift sensor 36 functions as a drive-train output transmitting state detecting unit. The engine rotational state detecting unit may execute the process for obtaining the average engine speed Nea and the engine speed fluctuation amount ΔNe that is executed by the ECU 30 based on the detection value of the crankshaft rotational speed sensor 32. The rotational fluctuation inhibiting unit may execute the processes of steps S116, S118, and S120 that are executed by the ECU 30. The rotational fluctuation inhibiting condition adjusting unit may execute the processes of steps S112 and S114 that the engine speed reference value A and the engine speed fluctuation amount reference value B are set according to the maps MAPa and MAPb.

In accordance with the first embodiment described in the foregoing, the following effects may be obtained. (I). In the DMF resonance inhibiting process (FIG. 2) that is executed by the ECU 30, the engine speed reference value A and the engine speed fluctuation reference value B are set (S112 and S114). Those reference values A and B are compared with the average engine speed Nea and the engine speed fluctuation amount ΔNe, and thereby a determination is made about the state whether or not the engine rotational state approaches the resonance rotational speed (S116 and S118). If the engine rotational state approaches the resonance rotational speed ("YES" in both steps S116 and S118), the rotational fluctuation inhibiting process (S120) is executed. This inhibits strong resonance and an engine stall.

Values of the engine speed reference value A and the engine speed fluctuation amount reference value B are adjusted based on the operating state of the engine 2 and the output transmitting state of the drive-train with the maps MAPa and MAPb (FIGS. 4 and 7) (S112 and S114). In this adjustment, the average engine speed Nea is calculated as the operating state of the engine 2. When the deceleration of the average engine speed Nea (engine speed deceleration Dne) is larger, the engine speed reference value A is gradually set to a larger value between the lower engine speed limit for resonance inhibition and the upper engine speed limit for preventing an error determination, as shown in FIG. 4. The engine speed fluctuation amount reference value B is gradually set to a smaller value between the upper engine speed limit fluctuation amount for resonance inhibition and the lower engine speed limit fluctuation amount for preventing an error determination, as shown in FIG. 7.

Assuming that the vehicle in traveling with a fixed gear position (here, the second gear position) is stopped by the processes, the changes in the instant engine speed Ne, the engine speed fluctuation amount, the vehicle acceleration g, and the torque fluctuation Nm of the crankshaft 2a that occur while the vehicle is stopped are indicated in FIGS. 8A, 8B, 8C, and 8D, respectively.

For comparison, FIGS. 9A to 9D indicate a case that the rotational fluctuation inhibiting process (S120) is executed later than an appropriate timing due to use of fixed engine speed reference value A and engine speed fluctuation amount reference value B. Similarly to FIGS. 8A to 8D, the changes in the instant engine speed Ne, the engine speed fluctuation amount, the vehicle acceleration g, and the torque fluctuation Nm of the crankshaft 2a are indicated in FIGS. 9A, 9B, 9C, and 9D, respectively. Each of the drawings shows that large vertical oscillation is generated and strong resonance is generated. Compared to this case, FIG. 8A to 8D in accordance with the first embodiment show that even if the engine finally stops, no large vertical oscillation is generated, and strong resonance can be inhibited.

Therefore, in the comparison example (FIGS. 9A to 9D), an engine stall occurs at a timing tes that strong resonance is generated. However, in the case of the first embodiment (FIGS. 8A to 8D), the engine speed reference value A and the engine speed fluctuation amount reference value B are adjusted to values corresponding to the engine speed deceleration Dne, and thereby the rotational fluctuation inhibiting process (S120) is early executed. Accordingly, even if the average engine speed Nea decreases to a level similar to that at the timing tes, an engine stall is inhibited. Thereafter, engine can be continuously operated according to an intention of the driver.

Figure 10:
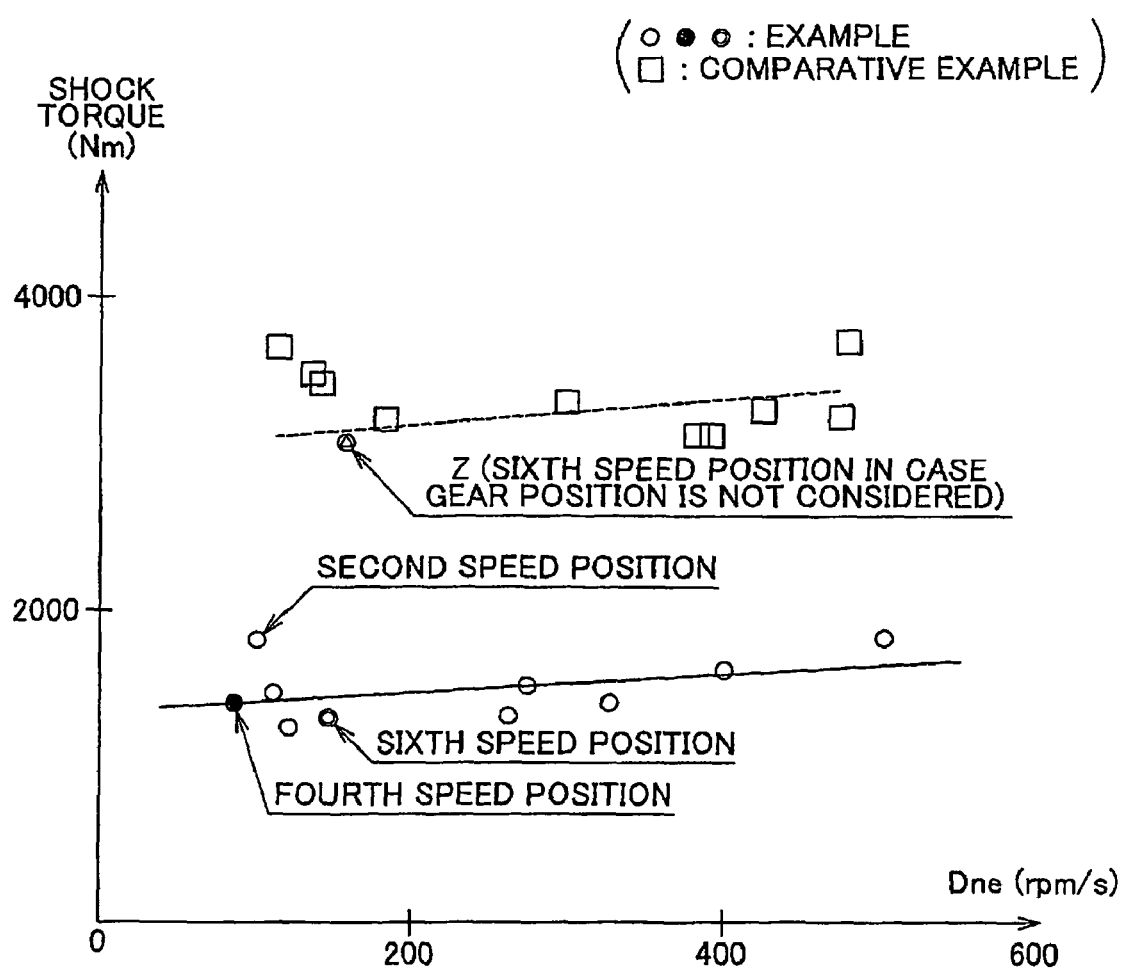
FIG. 10 is a graph that indicates the effects of the first embodiment in each gear position.

(II). Further, the adjustment states of the engine speed reference value A and the engine speed fluctuation amount reference value B are changed based on the gear position SFT. Accordingly, as shown in FIG. 10, in any gear positions (circle, filled circle, and double circle), the shock torque Nm at the DMF 24 is sufficiently lower than the comparison example (square: the fixed engine speed reference value A and the fixed engine speed fluctuation amount reference value B).

In the case that the reference values A and B are set based on the engine speed deceleration Dne on the maps MAPa and MAPb and the gear position is fixed at the second gear position, there is the effect to reduce a shock for the second gear position or the near gear positions. However, the shock torque is not sufficiently reduced for the sixth gear position as shown by a reference symbol Z in FIG. 10. Therefore, to reduce the shock torque for the gear positions to the sixth gear position without corresponding the reference values A and B to the gear position SFT, the maps MAPa and MAPb may be set to correspond to the sixth gear position and the gear positions near the sixth gear position. However, in case that the maps are corresponded to the sixth gear position or the gear positions near the sixth gear position as described above, although there is time until reaching the resonance rotational speed when the engine is actually decelerated in the second gear position, it is determined as "YES" in both steps S116 and 118 in FIG. 2, and the rotational fluctuation inhibiting process (S120) is executed. Therefore, an engine stall may occur due to unnecessary decrease in the engine output.

However, in the first embodiment, the engine speed deceleration Dne and the gear position SFT are together taken into consideration on the maps MAPa and MAPb. Accordingly, an engine stall due to such unnecessary decrease in the engine output may be inhibited.

(III). As described in section (II), the generated shock torque can be inhibited to a low level. Therefore, the shock torque to the DMF 24 can be retained lower than the fatigue limit torque according to Miner's law. Accordingly, the life of the DMF 24 can be made longer. This allows a sufficiently long guarantee period.

Second Embodiment

Figure 11:
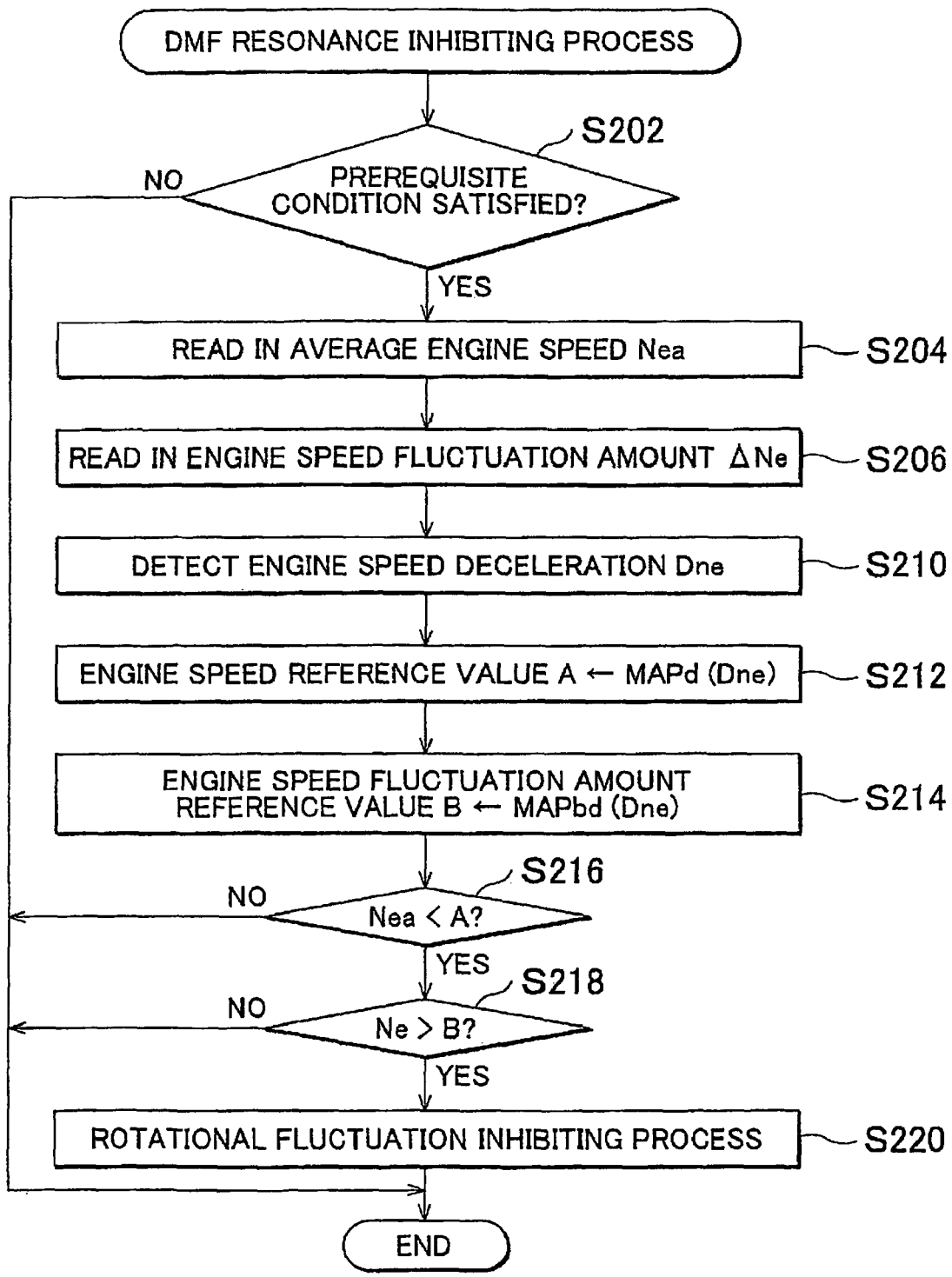
FIG. 11 is a flowchart of the DMF resonance inhibiting process that is executed by the ECU in accordance with a second embodiment.

In a second embodiment, a process as demonstrated in FIG. 11 is executed as the DMF resonance inhibiting process. The configuration of the internal combustion engine is as shown in FIG. 1.

In FIG. 11, steps S202, S204, S206, S210, S216, S218, and S220 are the same processes as steps S102, S104, S106, S110, S116, S118, S120 in FIG. 2.

Figure 12:
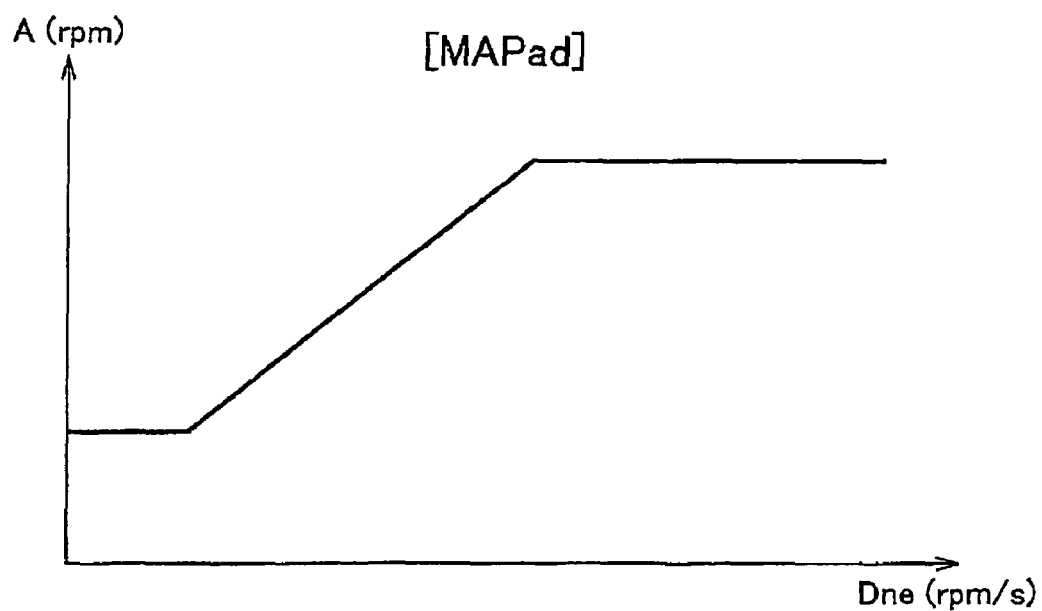
FIG. 12 is a explanatory diagram of an engine speed reference value setting map MAPad that is used in the DMF resonance inhibiting process in accordance with the second embodiment.
Figure 13:
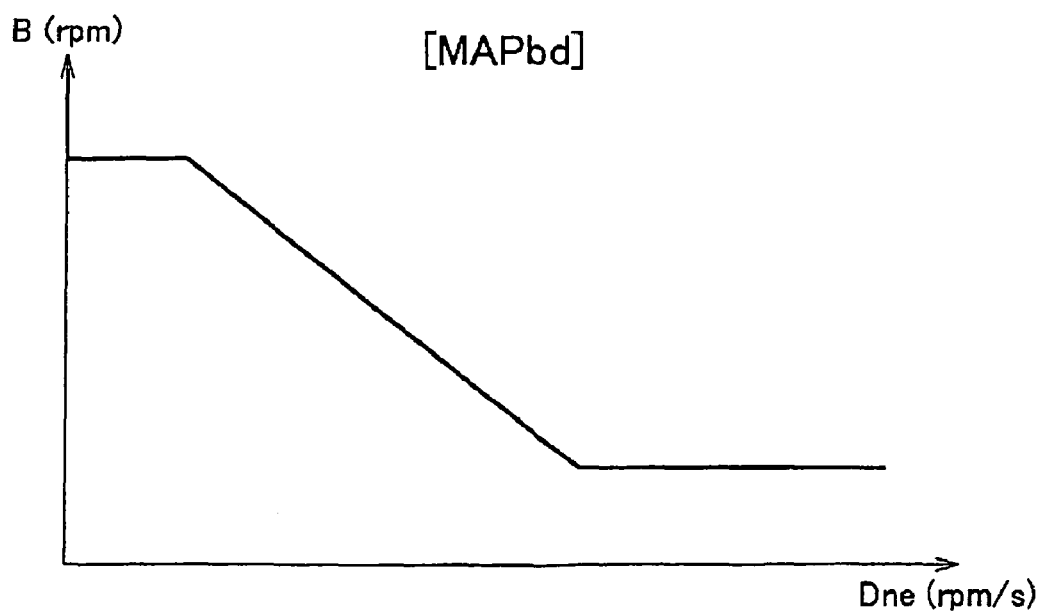
FIG. 13 is a explanatory diagram of an engine speed fluctuation amount reference value setting map MAPbd that is used in the DMF resonance inhibiting process in accordance with the second embodiment.

Differences in the processes are that there is no step S108, the engine speed reference value A is set according to a map MAPad shown in FIG. 12 and based only on the engine speed deceleration Dne in step S212, and the engine speed fluctuation amount reference value B is set according to a map MAPbd shown in FIG. 13 and based only on the engine speed deceleration Dne in step S214. The maps MAPad and MAPbd have, for example, settings based on the relationship between the engine speed deceleration Dne and the reference values A and B in the sixth gear position in the maps MAPa and MAPb that are shown in FIGS. 4 and 7, or the relationship in the gear position near the sixth gear position.

In the configuration described above, the rotational fluctuation inhibiting unit may execute the process of steps S216, S218, and S220 that are executed by the ECU 30. The rotational fluctuation inhibiting condition adjusting unit may execute the process of steps S212 and S214 that the engine speed reference value A and the engine speed fluctuation amount reference value B are set according to the maps MAPad and MAPbd.

In accordance with the second embodiment described above, the following effects are obtained. (I). Except for the correspondence to the gear position SFT, the effects of sections (I) and (II) of the first embodiment can be obtained.

Third Embodiment

Figure 14:
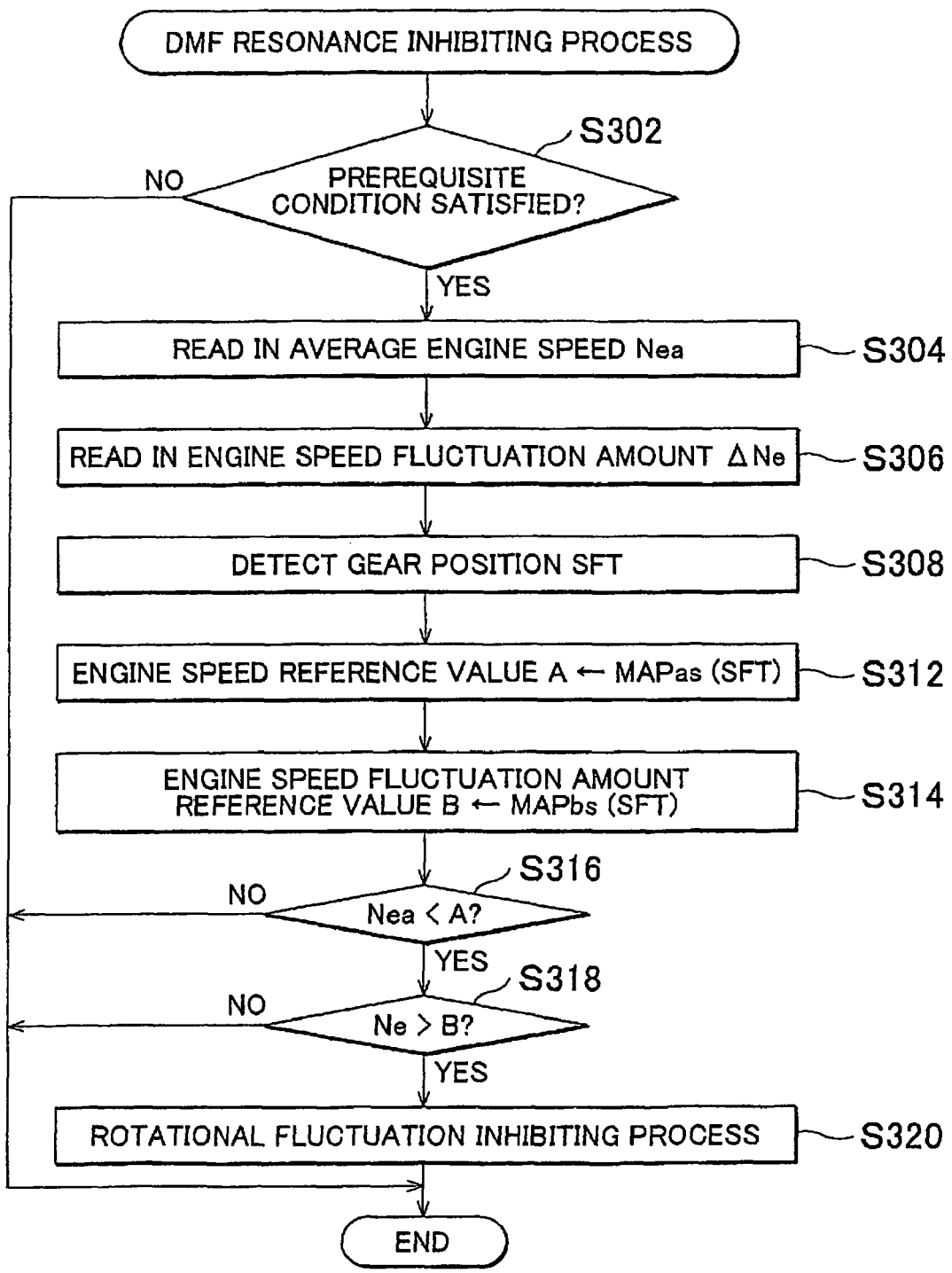
FIG. 14 is a flowchart of the DMF resonance inhibiting process that is executed by the ECU in accordance with a third embodiment.

In a third embodiment, a process as demonstrated in FIG. 14 is executed as the DMF resonance inhibiting process. The configuration of the internal combustion engine is as shown in FIG. 1.

In FIG. 14, steps S302, S304, S306, S308, S316, S318, and S320 are the same processes as steps S102, S104, S106, S108, S116, S118, S120 in FIG. 2.

Figure 15:
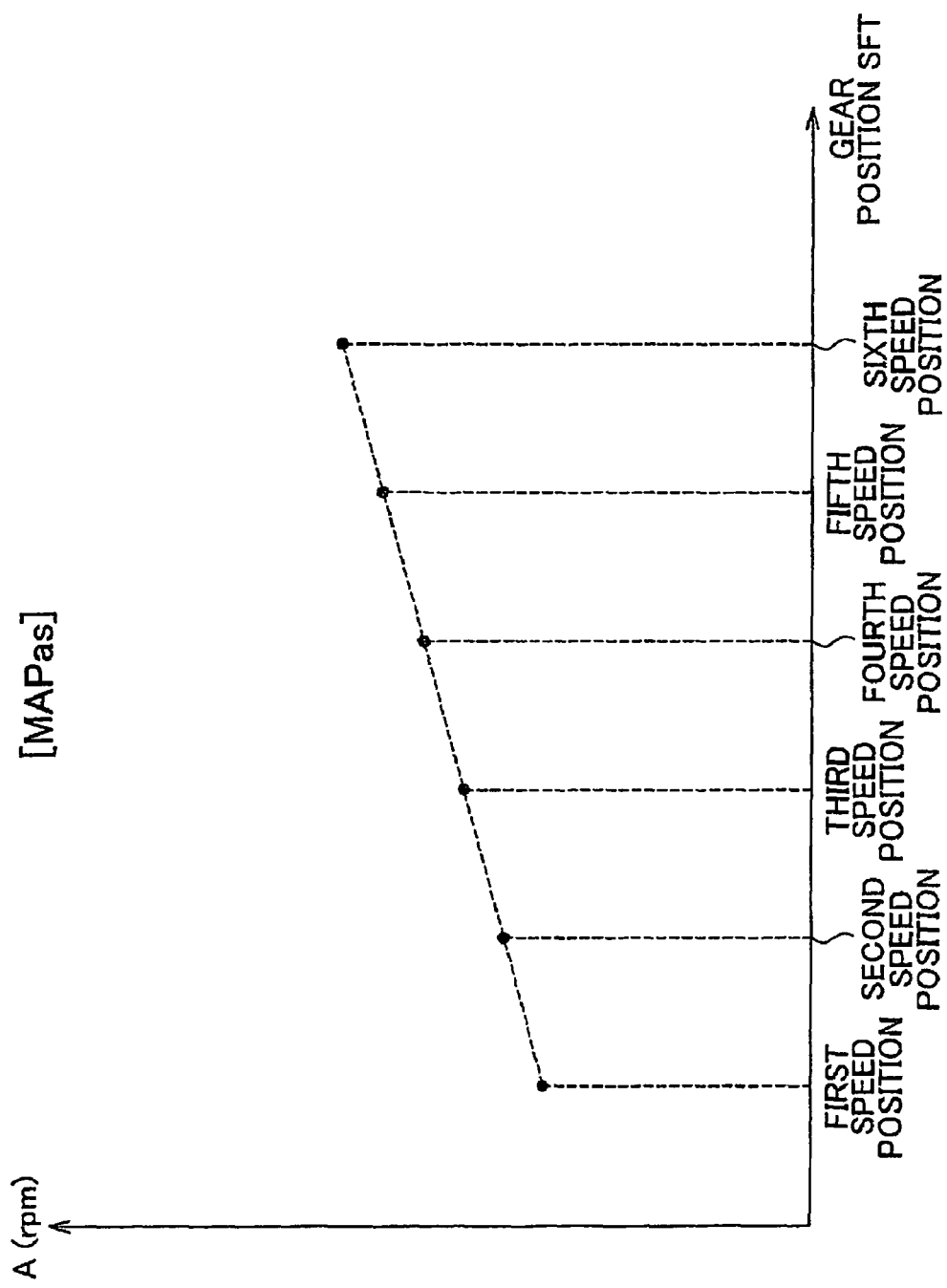
FIG. 15 is a explanatory diagram of an engine speed reference value setting map MAPas that is used in the DMF resonance inhibiting process in accordance with the third embodiment.
Figure 16:
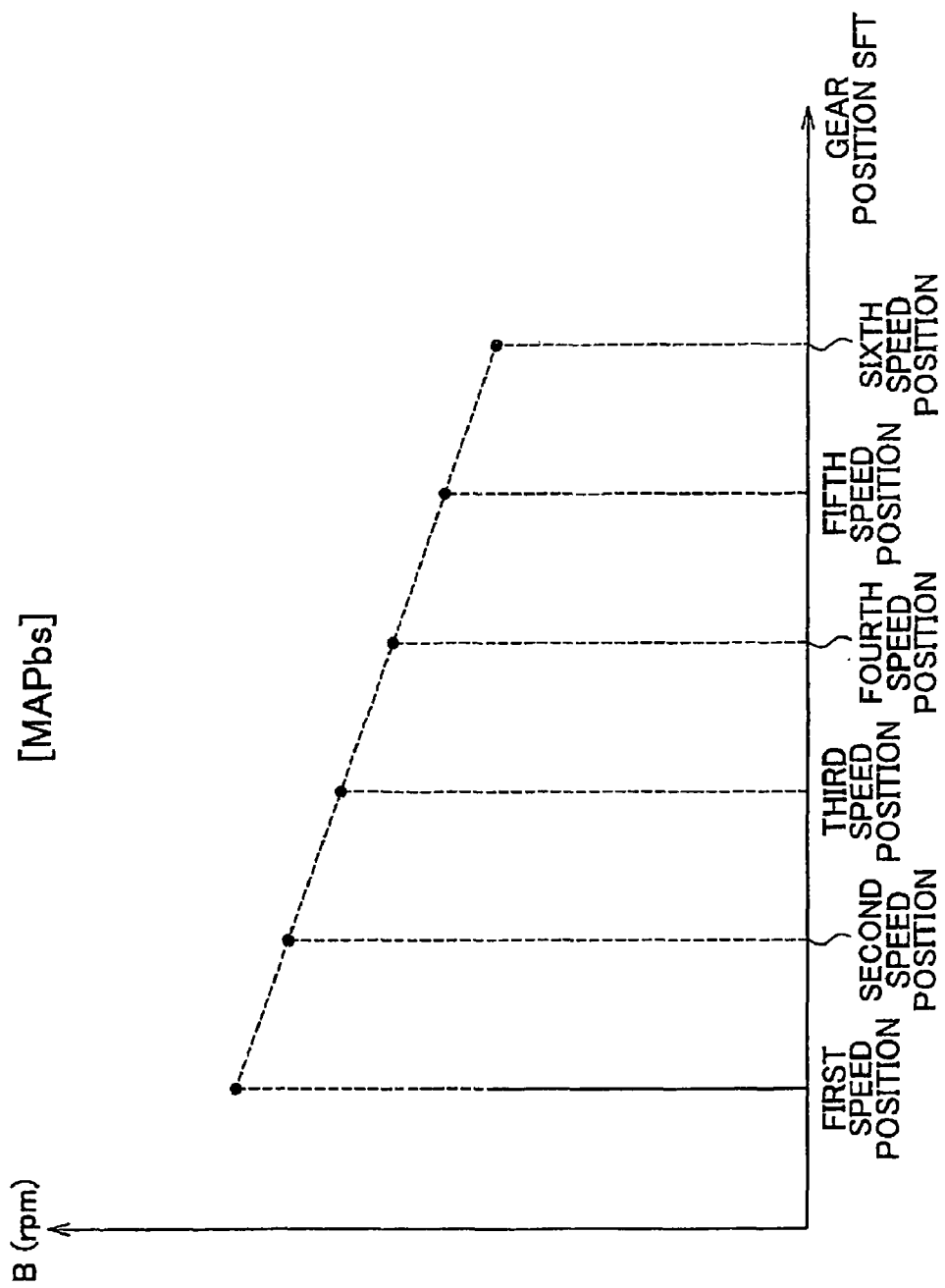
FIG. 16 is a explanatory diagram of an engine speed fluctuation amount reference value setting map MAPbs that is used in the DMF resonance inhibiting process in accordance with the third embodiment.

Differences in the processes are that there is no step S110, the engine speed reference value A is set according to a map MAPas shown in FIG. 15 and based only on the gear position SFT in step S312, and the engine speed fluctuation amount reference value B is set according to a map MAPbs shown in FIG. 16 and based only on the gear position SFT in step S314. On the map MAPas (FIG. 15), when the gear position SFT is shifted to a higher position, the resonance rotational speed is higher in the MT 28 of this embodiment, and the engine speed more easily approaches the resonance rotational speed. Therefore, considering such a situation, the engine speed reference value A is increased to a larger value for the higher gear positions so that the condition of step S316 among the rotational fluctuation inhibiting condition is early satisfied.

On the map MAPbs (FIG. 16), when the gear position SFT is shifted to a higher position, the resonance rotational speed is higher, and the engine speed more easily approaches the resonance rotational speed. Considering such a situation, the engine speed fluctuation amount reference value B is reduced to a smaller value for the higher gear positions so that the condition of step S318 among the rotational fluctuation inhibiting condition is early satisfied.

In the configuration described above, the rotational fluctuation inhibiting unit may execute the process of steps S316, S318, and S320 that are executed by the ECU 30. The rotational fluctuation inhibiting condition adjusting unit may execute the process of steps S312 and S314 that the engine speed reference value A and the engine speed fluctuation amount reference value B are set according to the maps MAPas and MAPbs.

In accordance with the third embodiment described in the foregoing, the following effects can be obtained. (I). In the DMF resonance inhibiting process (FIG. 14) that is executed by the ECU 30, the engine speed reference value A and the engine speed reference fluctuation reference value B are set (S312 and S314). Those reference values A and B are compared with the average engine speed Nea and the engine speed fluctuation amount ΔNe, and thereby a determination is made about the state whether or not the engine speed approaches the resonance rotational speed (S316 and S318). If the engine speed approaches the resonance rotational speed ("YES" in both steps S316 and S318), the rotational fluctuation inhibiting process (S320) is executed. This inhibits strong resonance and an engine stall.

Values of the engine speed reference value A and the engine speed fluctuation amount reference value B are adjusted based on the output transmitting state of the drivetrain with the maps MAPas and MAPbs (FIGS. 15 and 16) (S312 and S314). In this adjustment, as shown in FIG. 15, when the speed position SFT is higher, the engine speed reference value A is gradually set to a larger value based on the change in the resonance rotational speed according to the gear position SFT. As shown in FIG. 16, when the gear position SFT is higher, the engine speed fluctuation amount reference value B is gradually set to a smaller value based on the change in the resonance rotational speed according to the gear position SFT.

As described above, the reference values A and B are adjusted based on the output transmitting state from the engine 2 to the drive-train by the MT 28. This adjustment allows accurate determination about the approaching of the engine speed to the resonance rotational speed. The rotational fluctuation inhibiting process (S320) as the resonance inhibiting process can be executed at an appropriate timing. As a result, strong resonance and an engine stall can be inhibited.

Other Embodiments (a). In the first and second embodiments, the reference values A and B are obtained with use of the rotational state of the crankshaft 2a (engine speed deceleration Dne). The rotational state of the crankshaft 2a (average engine speed Nea and engine speed fluctuation amount ΔNe) is compared with the reference values A and B, thereby determining whether or not the rotational fluctuation inhibiting process (S120 or S220) is executed. Instead of this, the vehicle deceleration that is obtained from the vehicle speed detected by the vehicle speed sensor on the output shaft of the MT 28 may be obtained as a value corresponding to the rotational state of the crankshaft 2a. The reference values A and B may be obtained with the vehicle deceleration instead of the engine speed deceleration Dne. The reference values A and B are compared with the average engine speed Nea and the engine speed fluctuation amount ΔNe, and thereby a determination may be made about whether or not the rotational fluctuation inhibiting process (S120 or S220) is executed.

(b). In each of the above embodiments, the engine speed reference value A and the engine speed fluctuation amount reference value B are compared with the average engine speed Nea and the engine speed fluctuation amount ΔNe, respectively. However, only the engine speed reference value A is compared with the average engine speed Nea, and thereby a determination may be made about whether or not the rotational fluctuation inhibiting process (S120, S220, or S320) is executed. Otherwise, only the engine speed fluctuation amount reference value B is compared with the engine speed fluctuation amount ΔNe, and thereby a determination may be made about whether or not the rotational fluctuation inhibiting process (S120, S220, or S320) is executed.

(c). In the rotational fluctuation inhibiting process (step S120, S220, or S320) that is executed in each of the above embodiments, as described above, the processes (1) to (4) can be executed in a combination or separately. However, in a case that the processes of (1) to (4) are executed in a combination, the rotational fluctuation inhibiting condition may be changed for each of the processes (1) to (4). In other words, a different map among the maps MAPa, MAPb, MAPad, MAPbd, MAPas, and MAPbs FIGS. 4, 7, 12, 13, 15, and 16) is selected for each of the processes (1) to (4), and thereby the rotational fluctuation inhibiting condition may be set.

(d). The peak value of the rotational acceleration of the crankshaft changes in response to the magnitude of the engine speed fluctuation. Therefore, as shown in FIG. 3, the amplitude of the oscillation of the crankshaft rotational speed is not directly obtained for the engine speed fluctuation amount ΔNe, but the peak value of the rotational acceleration of the crankshaft 2a may be obtained and used as the engine speed fluctuation amount ΔNe.

Further, the crankshaft rotational speed fluctuation corresponds to the work fluctuation of the crankshaft 2a. Therefore, the work fluctuation of the crankshaft 2a is calculated, and thereby the peak of the work fluctuation may be used as the engine speed fluctuation amount ΔNe. In other words, each of the DMF resonance inhibiting processes (FIGS. 2, 11, and 14) is executed with the peak value of the work fluctuation. The square value of the change in the engine speed in time corresponds to the work. Therefore, the resonance state may be determined with the square value of the change in the engine speed in time.

(e). Each of the above embodiment is applied to a diesel engine. However, the present invention may be applied to gasoline engines.

What is claimed is:

1. A control device for an internal combustion engine that transmits output to a drive-train via a dual mass flywheel, the control device comprising:
an engine rotational state detecting unit that detects rotational fluctuation of the internal combustion engine and an average engine speed of the internal combustion engine;
a rotational fluctuation inhibiting unit that executes a process of inhibiting rotational fluctuation for the internal combustion engine when a rotational fluctuation inhibiting condition is satisfied, wherein the rotational fluctuation inhibiting condition is a condition that an actual engine speed fluctuation amount of the internal combustion engine is larger than a reference value that is set for the engine speed fluctuation amount of the internal combustion engine; and
a rotational fluctuation inhibiting condition adjusting unit that adjusts the reference value so that the rotational fluctuation inhibiting condition is earlier satisfied when deceleration of the average engine speed of the internal combustion engine that is detected by the engine rotational state detecting unit is larger.

2. The control device according to claim 1 wherein the rotational fluctuation inhibiting condition adjusting unit reduces the reference value to a smaller value when the deceleration of the average engine speed of the internal combustion engine that is detected by the engine rotational state detecting unit is larger.

3. The control device according to claim 1, wherein the rotational fluctuation inhibiting unit sets, as the rotational fluctuation inhibiting condition, a condition that an actual average engine speed of the internal combustion engine is smaller than the reference value that is set for the average engine speed of the internal combustion engine and the actual engine speed fluctuation amount of the internal combustion engine is larger than the reference value that is set for the engine speed fluctuation amount of the internal combustion engine, and the rotational fluctuation inhibiting unit executes the process of inhibiting rotational fluctuation for the internal combustion engine when the both conditions are satisfied.

4. The control device according to claim 1, wherein the internal combustion engine is for driving a vehicle, and the engine rotational state detecting unit detects vehicle deceleration as a rotational state of the internal combustion engine.

5. The control device according to claim 1, further comprising:
a drive-train output transmitting state detecting unit that detects an output transmitting state of the drive-train;
wherein the rotational fluctuation inhibiting condition adjusting unit adjusts the reference value based on the output transmitting state that is detected by the drive-train output transmitting state detecting unit.

6. The control device according to claim 5, wherein the rotational fluctuation inhibiting condition adjusting unit changes the reference value based on resonance rotational speed of the dual mass flywheel that changes in response to the output transmitting state that is detected by the drive-train output transmitting state detecting unit.

7. The control device according to claim 5, wherein the drive-train includes a transmission, and the drive-train output transmitting state detecting unit detects a gear position of the transmission as the output transmitting state of the drive-train.

8. The control device according to claim 1, wherein the rotational fluctuation inhibiting unit executes either reduction of the output of the internal combustion engine or a change of the output fluctuation frequency of the internal combustion engine or both of those, thereby executing a process of inhibiting rotational fluctuation for the internal combustion engine.

9. A control device for an internal combustion engine that transmits output to a drive-train via a dual mass flywheel, the control device comprising:
   a drive-train output transmitting state detecting unit that detects an output transmitting state of the drive-train;
   an engine rotational state detecting unit that detects rotational fluctuation of the internal combustion engine and an average engine speed of the internal combustion engine;
   a rotational fluctuation inhibiting unit that executes a process of inhibiting rotational fluctuation for the internal combustion engine when a rotational fluctuation inhibiting condition is satisfied, wherein the rotational fluctuation inhibiting condition is a condition that an actual engine speed fluctuation amount of the internal combustion engine is larger than a reference value that is set for the engine speed fluctuation amount of the internal combustion engine; and
   a rotational fluctuation inhibiting condition adjusting unit that adjusts the reference value so that the rotational fluctuation inhibiting condition is earlier satisfied when a resonance rotational speed of the dual mass flywheel that corresponds to the output transmitting state is higher.

10. The control device according to claim 9, wherein the rotational fluctuation inhibiting unit sets, as the rotational fluctuation inhibiting condition, a condition that an actual average engine speed of the internal combustion engine is smaller than the reference value that is set for the average engine speed of the internal combustion engine and the actual engine speed fluctuation amount of the internal combustion engine is larger than the reference value set for the engine speed fluctuation amount of the internal combustion engine, and executes the process of inhibiting rotational fluctuation for the internal combustion engine when the conditions are both satisfied.

11. The control device according to claim 9, wherein the rotational fluctuation inhibiting unit executes either reduction of the output of the internal combustion engine or a change of the output fluctuation frequency of the internal combustion engine or both of those, thereby executing a process of inhibiting rotational fluctuation for the internal combustion engine.

* * * * *